US012639107B2

(12) United States Patent
Meghani et al.

(10) Patent No.: US 12,639,107 B2
(45) Date of Patent: May 26, 2026

(54) SCHEDULING WITH SUPPORT FOR MULTIPLE SCHEDULING OBJECTIVES

(71) Applicant: Hexagon Technology Center GmbH, Heerbrugg (CH)

(72) Inventors: Krishan Kumar Meghani, Hyderabad (IN); Gona Uday Kumar, Hyderabad (IN); Kiran Kumar Bodla, Hyderabad (IN); Tanna Rahul Udaya Kiran, Veeravasaram (IN); Kalyan Madhavaram, Renigunta Mandal (IN); Jyotirmoy Verma, Hyderabad (IN)

(73) Assignee: Hexagon Technology Center GmbH, Heerbrugg (CH)

( * ) Notice: Subject to any disclaimer, the term of this patent is extended or adjusted under 35 U.S.C. 154(b) by 506 days.

(21) Appl. No.: 17/483,986

(22) Filed: Sep. 24, 2021

(65) Prior Publication Data

US 2023/0096811 A1      Mar. 30, 2023

(51) Int. Cl.
*G06F 9/48*          (2006.01)
*G06N 3/04*          (2023.01)
*G06N 3/08*          (2023.01)

(52) U.S. Cl.
CPC ............. *G06F 9/4881* (2013.01); *G06N 3/04* (2013.01); *G06N 3/08* (2013.01)

(58) Field of Classification Search
CPC .......... G06F 9/4881; G06N 3/04; G06N 3/08; G06N 3/006; G06N 3/092; G06Q 10/06311; G06Q 10/06316
See application file for complete search history.

(56) References Cited

U.S. PATENT DOCUMENTS

| | | | |
|---|---|---|---|
| 7,797,139 | B2 | 9/2010 | Guthrie et al. |
| 10,766,136 | B1 | 9/2020 | Porter et al. |

(Continued)

FOREIGN PATENT DOCUMENTS

| | | |
|---|---|---|
| EP | 3579161 A1 | 12/2019 |
| JP | 2023013058 A | 1/2023 |
| WO | 2022026520 A1 | 2/2022 |

OTHER PUBLICATIONS

Cruz Coulson, N., et al., "Adaptive Microservice Scaling for Elastic Applications," retrieved from the Internet at <https://patents.google.com/scholar/13625390208809542843?q=Adaptive+Microservice+Scaling&scholar&oq=Adaptive+Microservice+Scaling//>, IEEE Internet of Things Journal, IEEE, USA, vol. 7 No. 5, 7, dated Jan. 2020, pp. 4195-4202 (8 pages).

(Continued)

*Primary Examiner* — Sisley N Kim
(74) *Attorney, Agent, or Firm* — Nutter McClennen & Fish LLP

(57)          ABSTRACT

A system for generating task schedules using an electronic device includes: a processor, the processor comprising neural networks; a memory coupled to the processor; a scheduler coupled to the processor, the scheduler is configured to: receive: a total work database configured to contain items representing work packages; a resources database configured to contain items representing resources required to fulfill items in the work packages; a constraints database configured to contain items representing constraints to fulfilling items in the work packages; and a scheduling objective database configured to designate a prime objective that is to be achieved by the optimum task schedule; provide a trained reinforcement learning engine for optimizing the task schedule based on inputs from the databases; and generate an optimum work package schedule to sequence the work packages using the trained reinforcement learning (Continued)

engine, wherein the optimum work package schedule maximizes the one or more prime objectives.

20 Claims, 16 Drawing Sheets

(56) References Cited

U.S. PATENT DOCUMENTS

| 12,070,847 | B1 * | 8/2024 | Ebrahimi Afrouzi ........................ |
| | | | B25J 9/1684 |
| 2014/0277666 | A1 | 9/2014 | Morkos |
| 2019/0394243 | A1 | 12/2019 | Wiig et al. |
| 2020/0257968 | A1 * | 8/2020 | Mitra ...................... H04L 67/51 |
| 2020/0334614 | A1 * | 10/2020 | Javaid .................. G06Q 10/109 |
| 2021/0065006 | A1 * | 3/2021 | Bade ...................... G06N 3/0475 |
| 2021/0125124 | A1 | 4/2021 | Meharwade et al. |
| 2021/0142249 | A1 | 5/2021 | Ellsworth et al. |
| 2021/0168827 | A1 * | 6/2021 | Shin ...................... G06F 9/4881 |
| 2021/0216358 | A1 | 7/2021 | Rana et al. |
| 2021/0216359 | A1 | 7/2021 | Rana et al. |
| 2021/0232990 | A1 | 7/2021 | Maunz et al. |
| 2021/0278825 | A1 * | 9/2021 | Wen ................. G05B 19/41885 |
| 2022/0343155 | A1 * | 10/2022 | Mitra .................... G06F 18/217 |
| 2022/0398547 | A1 | 12/2022 | Wang |
| 2022/0413455 | A1 * | 12/2022 | He .................. G05B 19/41865 |
| 2023/0094381 | A1 | 3/2023 | Meghani et al. |
| 2023/0095600 | A1 | 3/2023 | Meghani et al. |
| 2023/0102494 | A1 | 3/2023 | Meghani et al. |

OTHER PUBLICATIONS

International Search Report and Written Opinion for International Application No. PCT/US2022/044582, mailed Jan. 2, 2023 (16 pages).
United States Patent and Trademark Office Non Final Office Action for U.S. Appl. No. 17/483,941 dated Nov. 21, 2022 (51 pages).
United States Patent and Trademark Office Non Final Office Action for U.S. Appl. No. 17/484,029 dated Oct. 12, 2022 (26 pages).
Cunha, B., et al., "Intelligent Scheduling with Reinforcement Learning," Applied Sciences, 11 (8), p. 3710 (Year: 2021).
United States Patent and Trademark Office Final Office Action for U.S. Appl. No. 17/483,941 dated Jan. 27, 2023 (85 pages).
U.S. Appl. No. 17/483,941, filed Sep. 24, 2021, AI Auto-Scheduler.
PCT/US22/44582, Sep. 23, 2022, AI Training and Auto-Scheduler for Scheduling Multiple Work Projects With a Shared Resource and Multiple Scheduling Objectives.
U.S. Appl. No. 17/483,966, filed Sep. 24, 2021, AI Training to Produce Task Schedules.
U.S. Appl. No. 17/484,029, filed Sep. 24, 2021, Scheduling Multiple Work Projects With a Shared Resource.

* cited by examiner

200

220

210

240

230

250

Prime Objective: Minimize completion time

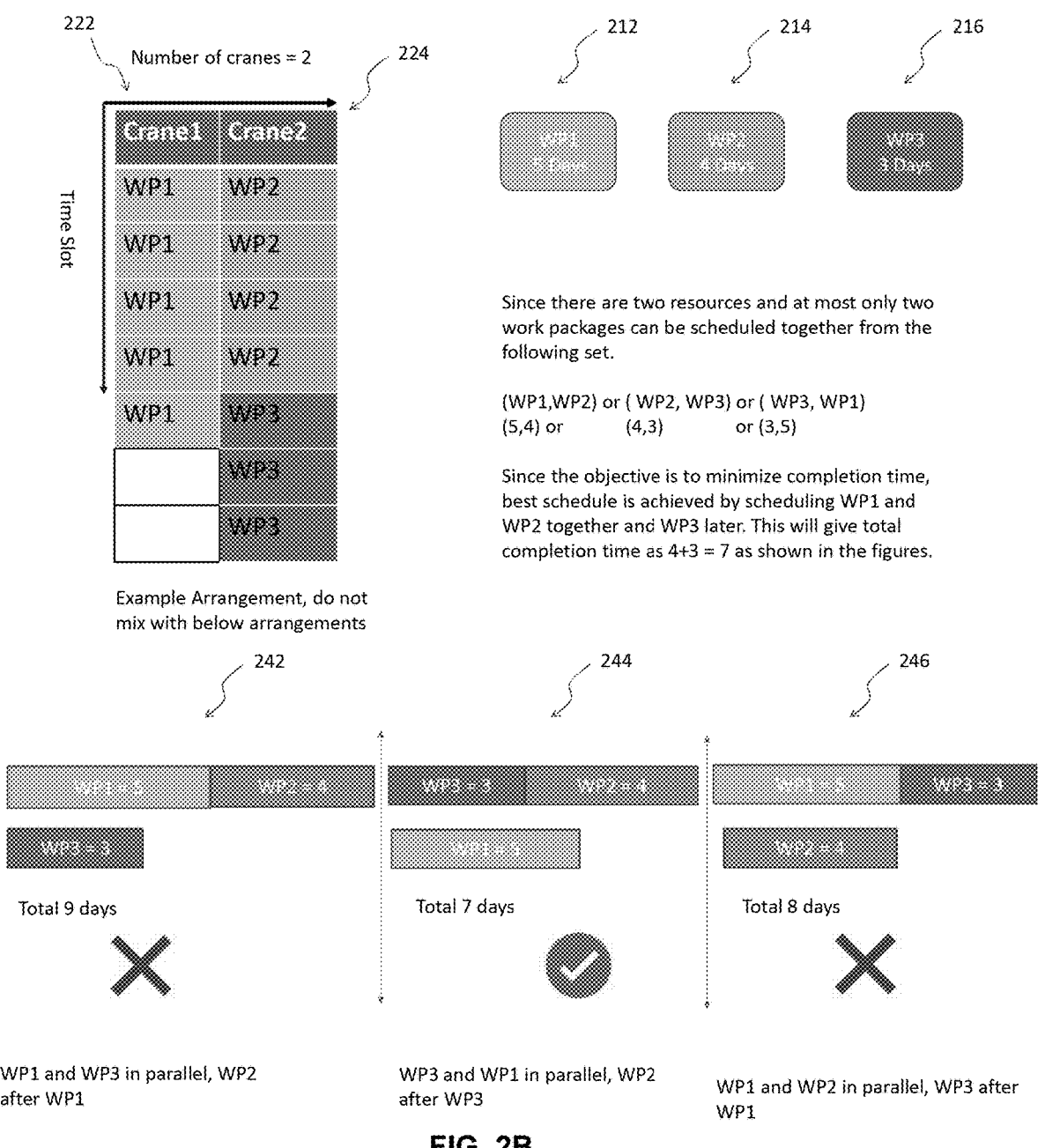

Since there are two resources and at most only two work packages can be scheduled together from the following set.

(WP1,WP2) or ( WP2, WP3) or ( WP3, WP1)
(5,4) or (4,3) or (3,5)

Since the objective is to minimize completion time, best schedule is achieved by scheduling WP1 and WP2 together and WP3 later. This will give total completion time as 4+3 = 7 as shown in the figures.

Example Arrangement, do not mix with below arrangements

Total 9 days

WP1 and WP3 in parallel, WP2 after WP1

Total 7 days

WP3 and WP1 in parallel, WP2 after WP3

Total 8 days

WP1 and WP2 in parallel, WP3 after WP1

FIG. 2B

Prime Objective: Minimize Average Slowdown

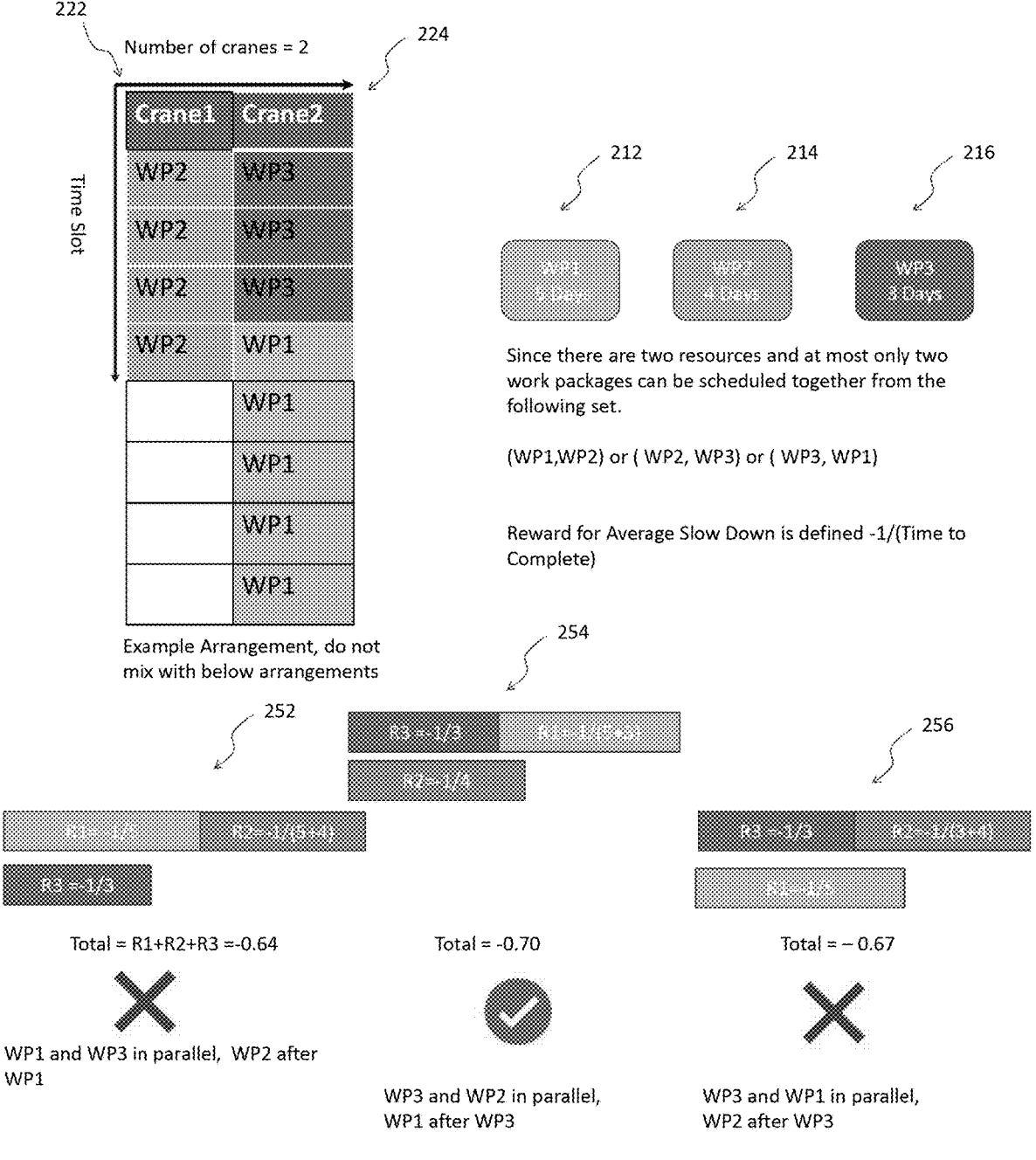

Since there are two resources and at most only two work packages can be scheduled together from the following set.

(WP1,WP2) or ( WP2, WP3) or ( WP3, WP1)

Reward for Average Slow Down is defined -1/(Time to Complete)

Example Arrangement, do not mix with below arrangements

Total = R1+R2+R3 =-0.64

Total = -0.70

Total = – 0.67

WP1 and WP3 in parallel, WP2 after WP1

WP3 and WP2 in parallel, WP1 after WP3

WP3 and WP1 in parallel, WP2 after WP3

FIG. 2C

Prime Objective: Maximize Resource Utilization

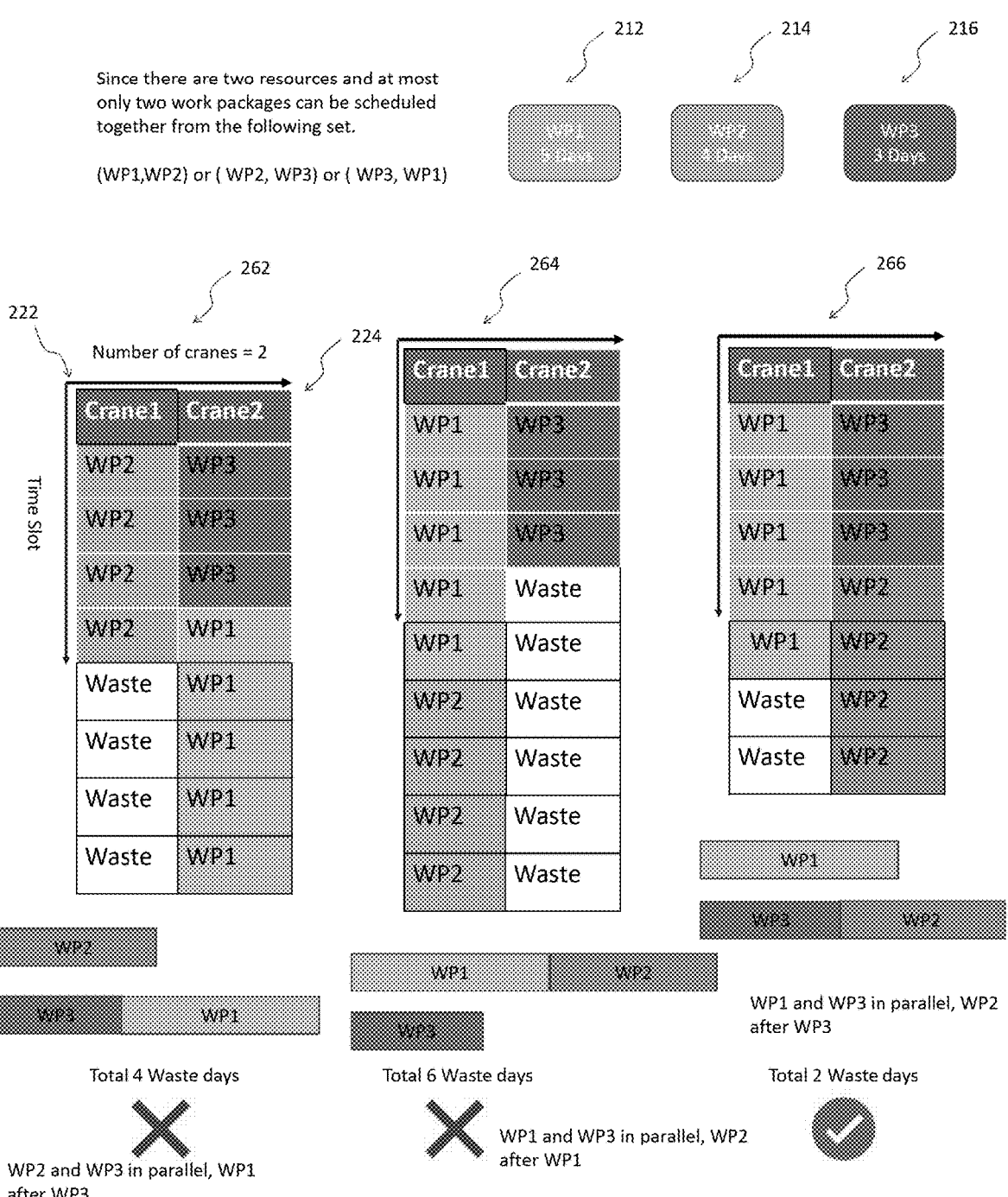

Since there are two resources and at most only two work packages can be scheduled together from the following set.

(WP1,WP2) or ( WP2, WP3) or ( WP3, WP1)

212    214    216

222    262    264    266    224

Time Slot

Number of cranes = 2

| Crane1 | Crane2 |
|--------|--------|
| WP2 | WP3 |
| WP2 | WP3 |
| WP2 | WP3 |
| WP2 | WP1 |
| Waste | WP1 |
| Waste | WP1 |
| Waste | WP1 |
| Waste | WP1 |

| Crane1 | Crane2 |
|--------|--------|
| WP1 | WP3 |
| WP1 | WP3 |
| WP1 | WP3 |
| WP1 | Waste |
| WP1 | Waste |
| WP2 | Waste |
| WP2 | Waste |
| WP2 | Waste |
| WP2 | Waste |

| Crane1 | Crane2 |
|--------|--------|
| WP1 | WP3 |
| WP1 | WP3 |
| WP1 | WP3 |
| WP1 | WP2 |
| WP1 | WP2 |
| Waste | WP2 |
| Waste | WP2 |

WP2

WP3    WP1

Total 4 Waste days

WP2 and WP3 in parallel, WP1 after WP3

WP1    WP2

WP3

Total 6 Waste days

WP1 and WP3 in parallel, WP2 after WP1

WP1

WP3    WP2

WP1 and WP3 in parallel, WP2 after WP3

Total 2 Waste days

Level3 Node(IWP)

Job Length
Length = 3 days

Resource Needs
1.R1, T1
2.R2, T2
...

320

330

400

410　420　430　440　450　　　　　460

600

610          640          615

650          660

620          630          625

700

800

880   870   860   850   840

810

Data for training,
inference and
saved AI model,
conceptual
representation

804

805

820   825   830   835   806

Or

820

JSON for training
can be generated
from this route
also

1000

1010 1020  1030  1040 1050                1055

1060

1065 1070  1075  1080 1085            1090

1200

1260

1210     1240     1250     1255

SCHEDULING WITH SUPPORT FOR MULTIPLE SCHEDULING OBJECTIVES

CROSS REFERENCE TO RELATED APPLICATION(S)

The subject matter of this patent application may be related to the subject matter of U.S. patent application Ser. No. 15/734,933 entitled WORKFLOW DEPLOYMENT filed Dec. 3, 2020 assigned to Hexagon Technology Center GmbH and published as United States Patent Application Publication No. 2021/0232990 published Jul. 29, 2021, which is hereby incorporated herein by reference in its entirety.

The subject matter of this patent application also may be related to the subject matter of U.S. patent application Ser. No. 16/551,246 entitled CONSTRUCTION SEQUENCING OPTIMIZATION filed Aug. 26, 2019 assigned to Hexagon Technology Center GmbH and published as United States Patent Application Publication No. 2021/0065006 published Mar. 4, 2021, which is hereby incorporated herein by reference in its entirety.

The subject matter of this patent application also may be related to the subject matter of U.S. patent application Ser. No. 16/967,380 entitled WORKFLOW GENERATION filed Aug. 4, 2020 assigned to Hexagon Technology Center GmbH and published as United States Patent Application Publication No. 2021/0216358 published Jul. 15, 2021, which is hereby incorporated herein by reference in its entirety.

The subject matter of this patent application also may be related to the subject matter of U.S. patent application Ser. No. 16/967,405 entitled WORKFLOW GENERATION filed Aug. 4, 2020 assigned to Hexagon Technology Center GmbH and published as United States Patent Application Publication No. 2021/0216359 published Jul. 15, 2021, which is hereby incorporated herein by reference in its entirety.

FIELD OF THE INVENTION

Various embodiments of the invention generally relate to scheduling large-scale capital projects and, more particularly, various embodiments relate to incorporating deep reinforcement learning trained artificial intelligence auto-schedulers to receive project database inputs and to automatically generate detailed, optimized schedules.

BACKGROUND OF THE INVENTION

Designing, building, and managing the construction of large-scale construction projects requires complex software to coordinate the resources required to complete the project. In addition, the construction of large projects often requires resources that are in limited supply and may have limited time windows in which they are available, due to the fact that other projects require the use of the same limited resources. Therefore, managing large-scale projects within the constraints imposed by other large-scale projects requires a comprehensive management solution that can accommodate a very complex interplay between resources and constraints.

Software has been developed that can receive project inputs such as the total work to be planned, as well as receive a breakdown of the total work into sub projects. However, this type of program may still require a user to complete the complex scheduling required to accommodate the various resources and the constraints imposed on those resources. Heuristic approaches can be applied to a small set of tasks, but when scheduling of large projects becomes very challenging even for very skilled experts. Due to the complexity of assembling such a complex schedule, many projects run beyond budget and behind on schedule.

SUMMARY OF VARIOUS EMBODIMENTS

In accordance with one embodiment of the invention, a system for generating task schedules using an electronic device includes: a processor, the processor comprising neural networks; a memory coupled to the processor; a scheduler coupled to the processor, the scheduler is configured to: receive: a total work database configured to contain items representing work packages; a resources database configured to contain items representing resources required to fulfill items in the work packages; a constraints database configured to contain items representing constraints to fulfilling items in the work packages; and a scheduling objective database configured to designate a prime objective that is to be achieved by the optimum task schedule; provide a trained reinforcement learning engine for optimizing the task schedule based on inputs from the total work database, the resource database, the constraints database, and the scheduling objectives database; and generate an optimum work package schedule to sequence the work packages using the trained reinforcement learning engine, wherein the optimum work package schedule maximizes the one or more prime objectives.

The system may include a total work database including at least a first list of a plurality of work packages to be scheduled. The resources database may include a second list of resource requirements for each work package of the plurality of work package to be performed, and a third list of time requirements for each resource requirement of the plurality of work packages to be scheduled. The constraints database may include a fourth list of resource types for each resource requirement of the plurality of work packages to be performed, a fifth list of a quantity of each resource type for each resource requirement of the plurality of work packages to be performed, and a sixth list of the time availability for each resource type for each resource requirement of the plurality of work packages to be performed. The scheduling objective database may be selected from a group of scheduling objectives including at least minimize average slow down, minimize average completion time, maximize efficiency of resource utilization, prioritize meeting desired customer dates, and prioritize meeting customer cost estimates.

The scheduler may generate the optimum work package schedule based on inputs from the total work database, the resource database, the constraints database, and the scheduling objectives database. The scheduler may generate the optimum work package schedule using the neural networks that have been trained by reinforcement learning to maximize the prime objectives. The neural networks may comprise one input layer, one or more hidden layers with a plurality of neurons, and one output layer.

In accordance with another embodiment of the invention, an AI auto-scheduler for automatically optimizing the schedule of third level work packages of a hierarchical work breakdown structure, wherein the hierarchical work breakdown structure includes: a first level representing the total work to be planned; a second level representing subsystems; and the third level representing the work packages; wherein the AI auto-scheduler is configured to: receive: a first level database configured to contain items representing the total work to be planned; a second level database configured to contain items representing the logical breakdown of the total work into subsystems; a third level database comprising all of the components and activities that will need to be ultimately completed to finish the job listed in the first level; a constraints database configured to contain items representing constraints to fulfilling the work packages; and a scheduling objective database configured to designate a prime objective that is to be achieved by third level work packages; automatically generate an optimized schedule for the third level work packages that prioritizes the prime objective that is to be achieved within the hierarchical work breakdown structure using a trained reinforcement learning engine based on inputs from the first level database, the second level database, the third level data base, the constraints database, and the scheduling objectives database.

The AI auto-scheduler may automatically determines and assigns resource needs, timeframes, dependencies between resources for a given work package, and dependencies between work packages for the third level work packages. The AI auto-scheduler may automatically sequence third level items relating to a given second level subsystem.

The AI auto-scheduler may automatically coordinate availability of the resources across multiple work packages so that a given resource will be available when needed for the sequenced third level items in the work package. The AI auto-scheduler may automatically coordinate availability of resources across multiple work packages so that the multiple work packages are optimized with respect to a given resource. The AI auto-scheduler further receives feedback relating to execution of the sequenced third level items in the work package and automatically updates the sequence of third level items based on a list of uncompleted third level items and resources needed for completion of such items The AI auto-scheduler further may receive industry expert feedback regarding scheduling best practices and updates the trained reinforcement learning engine. The AI auto-scheduler may automatically update the sequence of third level items based on the list of uncompleted third level items. The AI auto-scheduler may automatically update the resources needed for completion of such items utilizing the updated trained reinforcement learning engine.

The AI auto-scheduler may produce a plurality of optimized third level work package candidates and presents alternative options to the schedule of third level work packages. The AI auto-scheduler may provide insights on scheduling of the third level work packages so that industry experts can be trained by the trained reinforcement learning engine.

In accordance with another embodiment of the invention, a method for generating an optimum task schedule for fulfilling a large-scale capital project using reinforcement learning includes receiving a total work database configured to contain items representing tasks in a work package, receiving a resources database configured to contain items representing resources required to fulfill items in the work package, receiving a constraints database configured to contain items representing constraints to fulfilling items in the work package, receiving a scheduling objectives database configured to designate one or more prime objectives that are to be achieved by the optimum task schedule, providing a trained reinforcement learning engine for optimizing the task schedule based on inputs from the total work database, the resource database, the constraints database, and the scheduling objectives database, and generating an optimum task schedule to sequence the items in the work package using the trained reinforcement learning engine; wherein optimum task schedule maximizes the one or more prime objectives.

In accordance with another embodiment of the invention, a method for training artificial intelligence software to make new task schedules includes generating a plurality of data sets for a plurality of different work projects by simulating a plurality of different combinations of: a total work database configured to contain items representing installation work packages, a resources database configured to contain items representing resources required to fulfill items in the installation work package, a constraints database configured to contain items representing constraints to fulfilling items in the installation work package, and a scheduling objectives database configured to designate one or more prime objectives that are to be achieved by the new task schedules, and training a reinforcement learning engine to maximize one or more prime objectives for each data set of the plurality of data sets.

The total work database may include at least a first list of a plurality of tasks to be performed. The resources database may include a second list of resource requirements for each task of the plurality of tasks to be performed, and a third list of time requirements for each resource requirement of the plurality of tasks to be performed. The constraints database may include a fourth list of resource types for each resource requirement of the plurality of tasks to be performed, a fifth list of a quantity of each resource type for each resource requirement of the plurality of tasks to be performed, and a sixth list of the time availability for each resource type for each resource requirement of the plurality of tasks to be performed.

The plurality of different work projects may include several hundreds of projects. The total number of work packages in the total work database, the resource database, the constraints database, and the scheduling objectives database varies from about ten to more than one thousand depending upon the complexity of the projects.

The reinforcement learning engine may be configured to provide an artificial intelligence total job duration service, an artificial intelligence resource requirement service, an artificial intelligence task dependency service, and an artificial intelligence resource dependency service. The services may be provided as cloud-based micro-services.

In accordance with another embodiment of the invention, a system for training artificial intelligence software to make new task schedules includes: a processor, the processor comprising neural networks; a memory coupled to the processor; a scheduling trainer coupled to the processor, wherein the training scheduler is configured to: generate a plurality of data sets for a plurality of different work projects by simulating a plurality of different combinations of: a total work database configured to contain items representing installation work packages; a resources database configured to contain items representing resources required to fulfill items in the installation work package; a constraints database configured to contain items representing constraints to fulfilling items in the installation work package; and a scheduling objectives database configured to designate one or more prime objectives that are to be achieved by the new task schedules; and train a reinforcement learning engine to maximize one or more prime objectives for each data set of the plurality of data sets.

The plurality of different work projects may include several hundreds of projects. The total number of work packages in the total work database, the resource database, the constraints database, and the scheduling objectives database may vary from about ten to more than one thousand depending upon the complexity of the projects.

The reinforcement learning engine may include a network architecture that includes neural networks. The neural network may have one input layer, one or more hidden layers having a plurality of neurons, and an output layer. The weight distribution may use a Gaussian distribution with different standard deviations.

The reinforcement learning engine may be a deep reinforcement learning engine. The deep reinforcement learning engine may learn from simulated training data based on a reward function.

The one or more prime objectives may be selected from a group of objectives comprising at least: minimize average slow down; minimize average completion time; maximize efficiency of resource utilization; prioritize meeting desired customer dates; and prioritize meeting customer estimates.

The reinforcement learning engine may be configured to provide: an artificial intelligence total job duration service; an artificial intelligence resource requirement service; an artificial intelligence task dependency service; and an artificial intelligence resource dependency service. The services may be provided as cloud-based micro-services.

In accordance with another embodiment of the invention, a system for generating a task schedule for a target work project using an electronic device includes: at least one processor coupled to at least one memory storing computer program instructions which, when run on the at least one processor, causes the system to perform computer processes includes: providing a reinforcement learning engine trained for a plurality of different scheduling objectives based on a plurality of data sets representing a plurality of different work projects including at least one of simulated work projects or actual completed work projects, each scheduling objective having a different reinforcement learning reward function; and generating a task schedule for the target work project by the trained reinforcement learning engine based on a selected scheduling objective from among the plurality of different scheduling objectives and its corresponding reward function, wherein the trained reinforcement learning engine is capable of generating different task schedules for the target work project based on the plurality of scheduling objectives.

The target work project may be associated with a total work database configured to contain items representing work packages, a resources database configured to contain items representing resources required to fulfill the work packages, a constraints database configured to contain items representing constraints to fulfilling the work packages, and a scheduling objective database configured to designate a prime objective that is to be achieved by the optimum task schedule.

The plurality of different scheduling objectives may include minimize average slow down; minimize average completion time; maximize efficiency of resource utilization; prioritize meeting desired customer dates; and prioritize meeting customer cost estimates.

The reinforcement learning engine may include at least one neural network. The at least one neural network may include one input layer, one or more hidden layers with a plurality of neurons, and one output layer.

The optimum task schedule may include a sequence of work packages to be performed, a start date and an end date for each work package of the plurality of work packages to be performed, and a schedule chart for each work package of the plurality of work packages to be performed.

The trained reinforcement learning engine may be further configured to provide an artificial intelligence total job duration service, an artificial intelligence resource requirement service, an artificial intelligence work package dependency service, and an artificial intelligence resource dependency service. The services may be provided as cloud-based micro-services.

The reinforcement learning engine may receive user feedback regarding the task schedule for the target work project generated by the trained reinforcement learning engine. The reinforcement learning engine may update at least one reward function based on the user feedback.

In accordance with another embodiment of the invention, a method for generating a task schedule for a target work project using an electronic device includes: providing a reinforcement learning engine trained for a plurality of different scheduling objectives based on a plurality of data sets representing a plurality of different work projects including at least one of simulated work projects or actual completed work projects, each scheduling objective having a different reinforcement learning reward function; and generating a task schedule for the target work project by the trained reinforcement learning engine based on a selected scheduling objective from among the plurality of different scheduling objectives and its corresponding reward function, wherein the trained reinforcement learning engine is capable of generating different task schedules for the target work project based on the plurality of scheduling objectives.

In accordance with another embodiment of the invention, a system for generating task schedules for a plurality of work projects using an electronic device, the plurality of work projects requiring access to a given shared resource, the system includes at least one processor coupled to at least one memory storing computer program instructions which, when run on the at least one processor, causes the system to perform computer processes including: providing a reinforcement learning engine trained on a plurality of data sets representing a plurality of different work projects including at least one of simulated work projects or actual completed work projects, and generating a task schedule for each of the plurality of work projects by the trained reinforcement learning engine with availability of the shared resource coordinated across the plurality of task schedules with at least one task schedule optimized for a selected scheduling objective.

Each work project may be associated with a total work database configured to contain items representing work packages, a resources database configured to contain items representing resources required to fulfill the work packages, a constraints database configured to contain items representing constraints to fulfilling the work packages, and a scheduling objective database configured to designate a prime objective that is to be achieved by the optimum task schedule.

The task schedule may include a sequence of work packages to be performed, a start date and an end date for each work package of the plurality of work packages to be performed, and a schedule chart for each work package of the plurality of work packages to be performed.

The reinforcement learning engine may be further configured to provide an artificial intelligence total job duration service, an artificial intelligence resource requirement service, an artificial intelligence work package dependency service, and an artificial intelligence resource dependency service. The services may be provided as cloud-based micro-services.

The reinforcement learning engine may receive user feedback regarding at least one task schedule and may update at least one reward function based on the user feedback.

In accordance with another embodiment of the invention, a method for generating task schedules for a plurality of work projects using an electronic device, the plurality of work projects requiring access to a given shared resource, the method including providing a reinforcement learning engine trained on a plurality of data sets representing a plurality of different work projects including at least one of simulated work projects or actual completed work projects, and generating a task schedule for each of the plurality of work projects by the trained reinforcement learning engine with availability of the shared resource coordinated across the plurality of task schedules with at least one task schedule optimized for a selected scheduling objective.

The total work database may include at least a first list of a plurality of work packages to be performed. The resources database may include a second list of resource requirements for each work package of the plurality of work package to be performed; and a third list of time requirements for each resource requirement of the plurality of work packages to be performed. The constraints database may include a fourth list of resource types for each resource requirement of the plurality of work packages to be performed, a fifth list of a quantity of each resource type for each resource requirement of the plurality of work packages to be performed, and a sixth list of the time availability for each resource type for each resource requirement of the plurality of work packages to be performed.

The scheduling objective may include one of minimize average slow down; minimize average completion time; maximize efficiency of resource utilization; prioritize meeting desired customer dates; or prioritize meeting customer cost estimates.

The reinforcement learning engine may include at least one neural network. The at least one neural network may include one input layer, one or more hidden layers with a plurality of neurons, and one output layer. The reinforcement learning engine is further configured to provide an artificial intelligence total job duration service, an artificial intelligence resource requirement service, an artificial intelligence work package dependency service, and an artificial intelligence resource dependency service. The services may be provided as cloud-based micro-services.

The reinforcement learning engine may receive user feedback at least one task schedule. The reinforcement learning engine may receive updates at least one reward function based on the user feedback.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2B schematically illustrates an embodiment of a simplified process to optimize the scheduling objective of "Minimize Completion Time";

FIG. 2C schematically illustrates an embodiment of a simplified process to optimize the scheduling objective of "Minimize Average Slowdown";

FIG. 2D schematically illustrates an embodiment of a simplified process to optimize the scheduling objective of "Maximize Resource Utilization";

DESCRIPTION OF ILLUSTRATIVE EMBODIMENTS

Large-scale capital projects, such as building power plants, high rise complexes, large industrial and/or civil construction, and the like, involves designing the project in great detail with professional design software products. The professional design software products produce a work breakdown structure (WBS) that is a hierarchical and incremental decomposition of the work/plan/project into phases, deliverables and work packages. It is a tree structure, which shows a subdivision of effort required to achieve an objective. The WBS is a common framework for the natural development of the overall planning and control of a contract, and is the basis for dividing work into definable increments from which a detailed schedule may be developed.

Such a detailed schedule should accommodate various inputs that are related to a large capital project. Such inputs include a total listing of all the tasks/items that need to be completed, as well as all of the resources required. The detailed schedule should also receive how many of a given resource is available, as well as the durations the resources will be required. The detailed schedule should also accommodate the constraints to those resources, such as the dates and the durations of time they are available. The detailed schedule should also accommodate specific objectives to be optimized, such as minimizing average slowdowns, minimizing average completion times, and the like. Disclosed herein are embodiments of an AI auto-scheduler that generates detailed schedules based on inputs, such as those described above.

AI Auto-Scheduler

Figure 1:
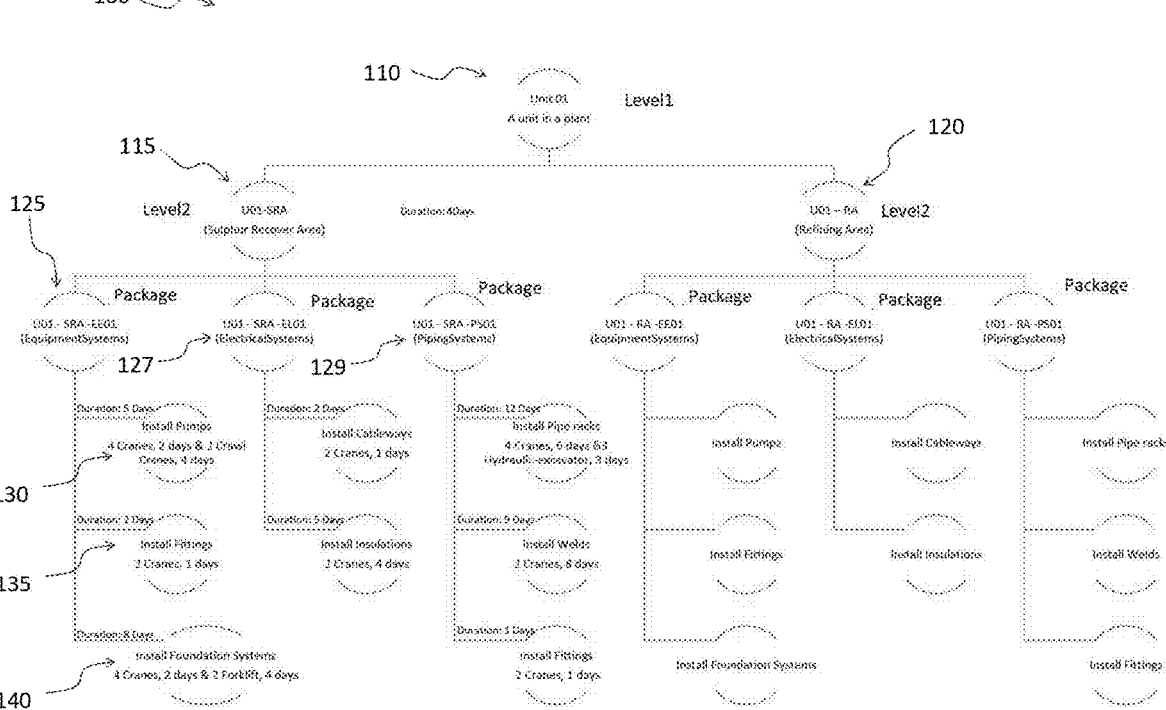
FIG. 1 presents a schematic representation a combined three level work breakdown structure.

FIG. 1 presents a schematic representation a combined three level work breakdown structure (WBS) 100. The first level, level 1, represents the total work to be planned. That is, level 1 describes the overall job that is to be completed.

For example, as shown in FIG. 1, the level 1 job (e.g., project) is to build a unit in a plant.

The second level, level 2, represents the logical breakdown of the total work into one or more subsystems. FIG. 1 shows two subsystems. These level 2 subsystems represent two distinct portions of the plant. The first subsystem is the Sulphur Recover Area 115 node, and the second is a Refining Area 120 node. Each of the subsystem nodes have three work packages. The work packages constitute level 3.

In FIG. 1, the level 2 Sulphur Recover Area 115 has level 3 work packages. They are Equipment Systems 125 node, Electrical Systems 127 node, and Piping Systems 129 node. Each level 3 work package has specific tasks (e.g., nodes) identified, and each task/node specifies required resources, and a duration that the resource will be required. For example, work package Equipment Systems 125 has the tasks/nodes of Install Pumps 130, Install Fittings 135, and Install Foundation Systems 140.

The third level, level 3, represents the actual work on the ground to be completed. Level 3 aggregates all of the components and activities that will need to be ultimately completed to finish the job listed in level 1. Each of the subsystems in level 2 will have a number work packages that must be completed to complete the subsystem. Level 3 aggregates all of the components and activities that will need to be ultimately completed to finish the job listed in level 1. Level 3 requires having a plan that has details of all of the parts that will go into the work package. For example, each work package will have specific nodes that contribute to the work package.

Each of the nodes 130, 135, and 140, as listed, for example in FIG. 1, will have resources that are required to perform the task, as well as a planned duration for how much time the resource will be required to complete each task. For example, as shown in FIG. 1, Install Pumps 130 requires 4 cranes for 2 days, and 2 crawl cranes for 4 days. Each task has a predetermined time slot during which it will need to be completed, and it will have resources which will be required to complete the task. Each of the specific resources for each node will be required for a certain duration within the time slot.

Successfully completing the level 1 job of building a unit of a plant 110, as shown in FIG. 1, requires planning and scheduling all of the tasks in the work packages. The detailed planning and scheduling involves creating a level 3 hierarchy, assigning components and activities for these components and assigning time frames to these activities, assigning resources to these activities, and aggregating all of these at level 3 nodes for job lengths and the resource needs. The sequencing between the level 3 nodes within the same level 2 node can also be defined. That is, the schedule will incorporate predetermined sequences of the activities within a certain level 3 node with other activities within other level 3 nodes that are under the level 2 node.

Figure 2A:
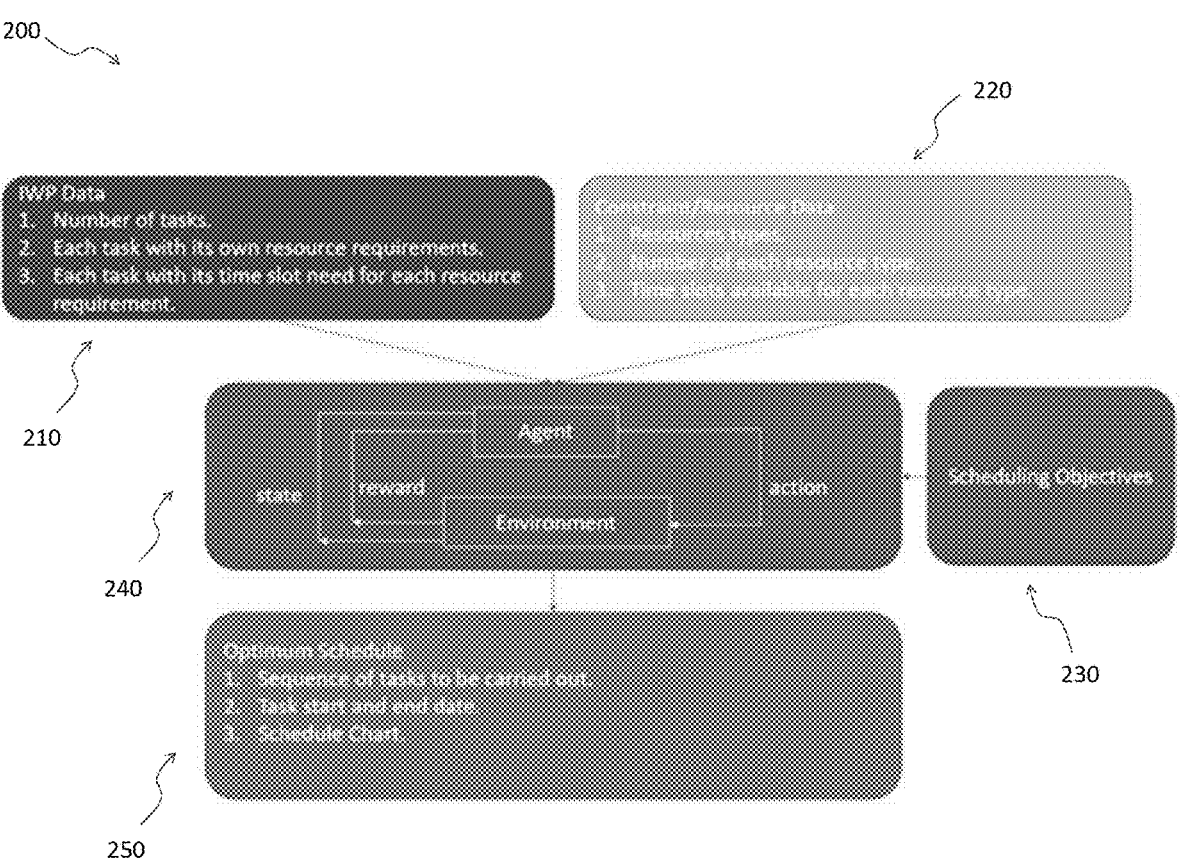
FIG. 2A schematically shows an embodiment of an overall design of an AI auto-scheduler.

FIG. 2A schematically shows an embodiment of the overall design of an AI auto-scheduler 200. The inputs into the AI auto-scheduler include Installation Work Package (IWP) data 210, constraints/resource data 220, and scheduling objectives data 230. The inputs 210, 220, and 230 are provided to a trained reinforcement engine 240 that has been trained by deep reinforcement learning to generate an optimized detailed task schedule based on the inputs 210, 220, and 230. The outputs from the AI auto-scheduler include an optimum work package (e.g., IWP) schedule 250 that is based the inputs 210, 220, and 230. The optimum IWP schedule 250 includes a detailed sequence of tasks to be carried out, task start dates and end dates, and a schedule chart.

The IWP data 210 includes a total work database that includes all of the items/nodes in level 2 and level 3 representing all of the work to be performed to complete the project identified in the level 1 node. This database can be very large enumerating each item/task in very complex building projects.

The IWP data 210 also includes a resources database that includes all of the resources required to fulfill items in the work packages, and the duration of time that will be required for each resource. For example, referring to FIG. 1, node 130 (Install Pumps) requires 4 cranes for 2 days, and 2 crawl cranes for 4 days. The IWP data 210 that is provided to the trained reinforcement learning engine will include all of the resources listed for all of the level 3 nodes for the entire project identified in the level 1 node 110.

The constraints data 220 includes a constraints database that includes all of the constrains on the resources listed in the resource database. One example of a constraint is that a certain resource type is required. For example, the completion of the level 3 node 125 will require at least 4 cranes, 2 crawl cranes, and 2 forklifts. Another example of a constraint is the number of each resource type that is available. For example, there may only be a fixed number of cranes available for a particular level 1 project. Another example of a constraint is a time availability of each resource. For example, for each level 3 node, the resource, for example a crane, may have different durations of time that the resource is required. Hence, each crane is constrained to be available for only a limited amount of time. Another type of constraint is related to sequencing of the tasks/nodes in level 2 and level 3, and is included in the constraint database. An illustrative example is provided by the level 3 nodes 130 and 135. Pumps are installed at node 130 and fittings are installed at node 135. The sequencing relationship between node 130 and node 135 is that node 130 happens before node 135, e.g., 130 135.

The scheduling objectives data 230 includes a scheduling objectives database that includes a prime objective that is to be achieved by the optimum schedule. For example, a prime objective of a detailed schedule may be to minimize average slow down. That is, a customer and/or project manager may want the schedule to be optimized to keep the project moving toward completion without slowing down. As another example, the optimum schedule might be to maximize the efficiency of resource utilization. Other examples include minimizing average completion time; prioritizing meeting desired customer dates; and prioritizing meeting customer cost estimates.

The trained reinforcement engine 240 receives the data inputs 210, 220, and 230 and generates schedule alternatives based on a reward function which codifies which and how many constraints are violated versus how many are optimized. This may be set by the simulation environment where the constraints data 220 are given as above, and the agent within the trained reinforcement engine 240 could then explore the action space towards first a feasible and—in a second or more steps—even optimal solution to a schedule 250. The agent decides which parts to select in the data inputs 210, 220, and 230 and schedules start and finish date, thus, generating a sequence of many IWP iteratively.

Reinforcement learning works by exploring possible actions and receiving feedback for each action in the form of a reward, and by that implicitly learning the underlying logic and dynamics of a system to eventually outperform classical approaches. The agent selects a single data input and sorts it into possible schedules. After each individual action or after several individual actions, e.g. whenever an individual IWP is "completed" (i.e. when no more components get added to the same IWP and the IWP is ready for scheduling) this is sent into a simulation which gives a reward. The reward is a real scalar but can take several aspects into account. A simulation engine could check the output 250 by the agent on whether it is feasible, e.g. whether any physical constraints are violated. Furthermore, the simulation environment puts out a state to the agent. This state defines the remaining components, resources, constraints, etc. The agent then selects a new action based on the updated reward and state.

An example of optimizing a schedule for a work package is to minimize the completion time, e.g., minimize the time it takes to complete all of the jobs from the time of the start of the first job. The reward for each time step$=-|J|$, where J is number of unfinished jobs in the system for each time step. The total reward is calculated by summing of all these individual rewards for all the time steps.

FIG. 2B schematically illustrates an embodiment of a greatly simplified process to optimize the scheduling objective 230 of "Minimize Completion Time." That is, the prime objective in the Scheduling Objectives is to "Minimize Completion Time." In the example illustrated in FIG. 2B, there are three work packages, WP1 212, WP2 214, and WP3 216. In this example, there are only two cranes, Crane 1 222 and Crane 2 224. Since there are only two resources (cranes), there can only be two work packages that can be scheduled together. In this example, the reward for the Minimize Completion Time is defined as $=-|J|$, where J is number of unfinished jobs in the system for each time step. The three example possible combinations can be represented as the following 242, 244 or 246 with the total number of days reward for each set equaling 9 days for set 242, 7 days for set 244, and 8 days for set 246, respectively. In this simplified example, the set optimizing the prime objective of "Minimize Completion Time" is the set 244, with a total completion time of 7 days. That is, since the objective is to minimize completion time, the best schedule is achieved by scheduling 212 and 214 together, and scheduling 216 for later. This will give total completion time in 244 as 4+3=7 as shown in FIG. 2B. This example arrangement is for illustration purposes and is not necessarily related to any other examples herein.

Another example of optimizing a schedule for a work package is to minimize the average slowdown of a job, e.g., minimize the normalized job completion time. This is represented as minimize Cj/Dj, where Cj is completion time of the work package j, Dj is the planned duration of the work package j. The reward for each time step=SUM (−1/Dj), where Dj is the planned duration of the work package, sum to be done for each of the job schedule and waiting jobs. The total reward is calculated by summing of all these individual rewards for all the time steps. When all the of the penalties over all of the time are summed, an exact job duration is provided. This reward signal is designed to exactly match the objective. The cumulative reward over time coincides with (negative) the sum of job slowdowns, hence maximizing the cumulative reward mimics minimizing the average slow down.

FIG. 2C schematically illustrates an embodiment of a simplified process to optimize the scheduling objective 230 of "Minimize Average Slowdown." As described above for FIG. 2B, there are three work packages, WP1 212, WP2 214, and WP3 216, and two cranes, 222 and 224. Since there are only two resources (cranes), there can only be two work packages that can be scheduled together. In this example, the reward for the Average Slow Down is defined as −1/(time to complete). The three example possible combinations can be represented as the following sets 252, 254 or 256 with the average slow down reward for each set equaling −0.64 for set 252, −0.70 for set 254, and −0.67 for set 256, respectively. In this simplified example, the set optimizing the prime objective of "Minimize Average Slowdown" is the set 254, with a total reward of −0.70. This example arrangement is for illustration purposes and is not necessarily related to any other examples herein.

Another example of optimizing a schedule for a work package is to maximize resource utilization of a job, e.g., to ensure that all of the resources are effectively utilized as much of the time as possible. This is represented by defining a reward for each time step=SUM (Rp/Ra), where Rp is the planned time for each resource and Ra is the available time for each resource. This is to be summed for all the resources for each time step. The total reward is calculated by summing of all these individual rewards for all the time steps.

FIG. 2D schematically illustrates an embodiment of a simplified process to optimize the scheduling objective of "Maximize Resource Utilization." As described above for FIG. 2B, there are three work packages, WP1 212, WP2 214, and WP3 216, and two cranes, 222 and 224. Since there are only two resources (cranes), there can be only two work packages that can be scheduled together. In this example, the reward for the Maximize Resource Utilization is defined by the number of waste days in the schedule. The three example possible combinations can be represented as the following sets 262, 264 or 266 with the total number of Waste days reward for each set equaling 4 Waste days for set 262, 6 Waste days for set 264, and 2 Waste days for set 266, respectively. In this simplified example, the set optimizing the prime objective of "Maximize Resource Utilization" is the set 266, with a total Waste days of only 2 days. This example arrangement is for illustration purposes and is not necessarily related to any other examples herein.

Figure 3:
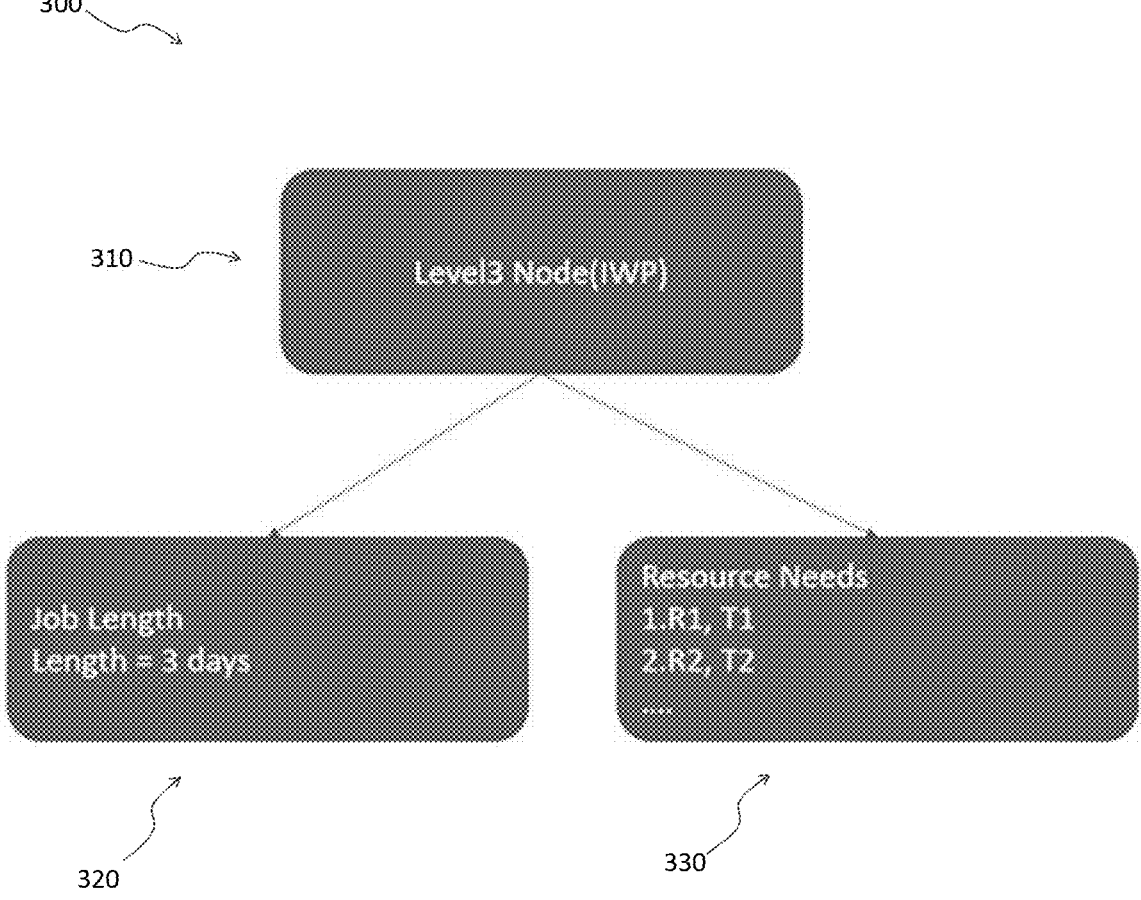
FIG. 3 schematically illustrates a portion of a level 3 node in an optimum work package schedule.

FIG. 3 schematically illustrates a portion of a level 3 node 300 in an optimum work package schedule 250. The level 3 node work package 310 illustrated in FIG. 3 has two scheduling lists. The first list 320 is the job length, which in the example shown in FIG. 3 is equal to 3 days. The second list 330 has a listing of resource needs.

Figure 4:
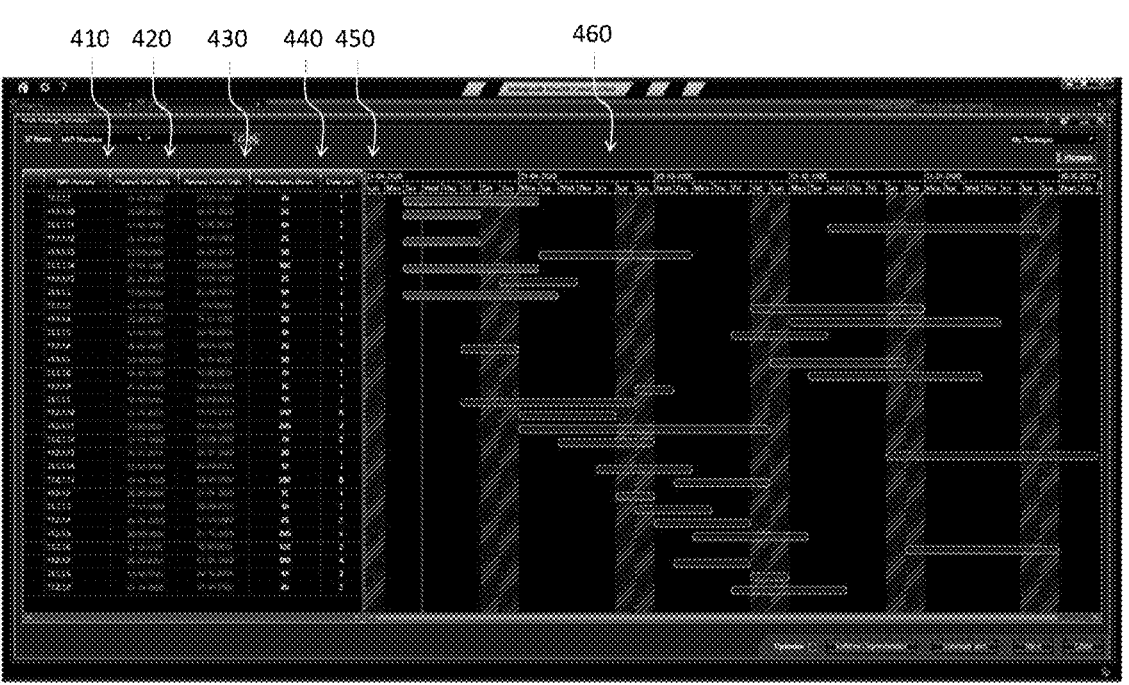
FIG. 4 illustrates a portion of a detailed schedule chart.

FIG. 4 illustrates a portion of a detailed schedule chart 400. The detailed schedule chart 400 is organized according to Installation Work Package (IWP) numbers 410. For each IP number 410, the chart lists a planned start date 420, a planned finish date 430, planned man hours 440, crew size 450, and a line chart 460 showing a graphic representation of a line in a calendar to show the planned start dates 420 and planned finish dates 430 for each IWP number 410 in comparison to the start and finish dates of other IWP numbers. In addition to the specific start dates 420 and finish dates 430, the detailed schedule chart shows the sequence of execution of the various tasks. In embodiments, the chart may be presented with less detail so that it shows the overall schedule including the level 1 and level 2 nodes. In embodiments, the chart may be presented with a great amount of detail, including the smallest and shortest duration items scheduled for completion.

The detailed schedule chart 400 presents the optimum work package schedule 250 in a graphical format (e.g., Gantt view/chart), including a listing of all of the tasks and the sequence of the tasks to be carried out. The various interdependencies of the level 2 nodes and level 3 nodes are illustrated and mapped on the Gantt chart. The detailed schedule chart 400 comprises at least a sequence of the first list of the work packages to be performed, a start date and an end date for each work package, a schedule chart for each work package, a start date and an end date for the first list of the work packages to be performed, and a schedule chart for the first list of the work packages to be performed.

In embodiments, the AI auto-scheduler 200 automatically generates the optimized schedule for third level work packages that optimize the prime objective that is to be achieved within the hierarchical work breakdown structure using the trained reinforcement learning engine 240 based on inputs from a first level database, a second level database, the constraints database 220, and the scheduling objectives database 230.

The AI auto-scheduler 200 may be further trained by providing user feedback and industry feedback. For example, the AI auto-scheduler 200 may receive feedback relating to execution of the sequenced third level items in the work package and automatically update the sequence of uncompleted third level items and resources needed for completion of such items. Furthermore, the AI auto-scheduler 200 may receive industry expert feedback regarding scheduling best practices and updates the trained reinforcement learning engine. The AI auto-scheduler 200 may automatically update the sequence of uncompleted third level items and resources needed for completion of such items based on the updated trained reinforcement learning engine.

In embodiments, the AI auto-scheduler 200 produces a plurality of optimized third level work package candidates and presents alternative options to the schedule of third level work packages.

In embodiments, the AI auto-scheduler 200 provides insights on scheduling of the third level work packages so that industry experts can be trained by the trained reinforcement learning engine.

Figure 5:
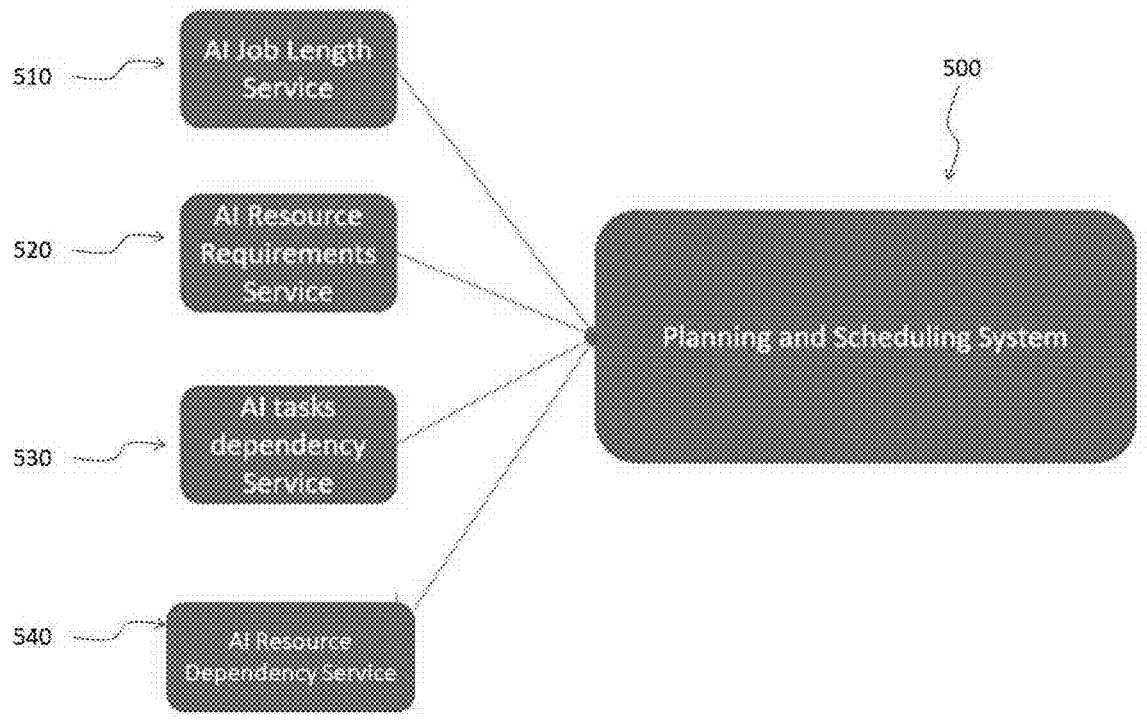
FIG. 5 illustrates a number of services using artificial intelligence.

In embodiments, the AI auto-scheduler 200 may provide a planning and scheduling system 500 as shown in FIG. 5. The planning and scheduling system 500 may provide a number of services using artificial intelligence (AI) as utilized in the trained reinforcement learning engine 550. For example, the planning and scheduling system 500 may provide an AI Job Length Service 510; an AI Resource Requirements Service 520; an AI Tasks Dependency Service 530; and an AI Resource Dependency Service 540. The foregoing services 510, 520, 530, and 540 may be provided as cloud-based micro-services.

In embodiments, the combination of AI services 500 and AI auto-scheduler 200 automatically determines and assigns resource needs, timeframes, dependencies between the resources for a given work package, and dependencies between third level work packages. The AI auto-scheduler 200 automatically sequences third level items relating to a given second level subsystem, and automatically coordinates availability of resources across multiple work packages so that a given resource will be available when needed for the sequenced third level items in the work package.

Figure 6:
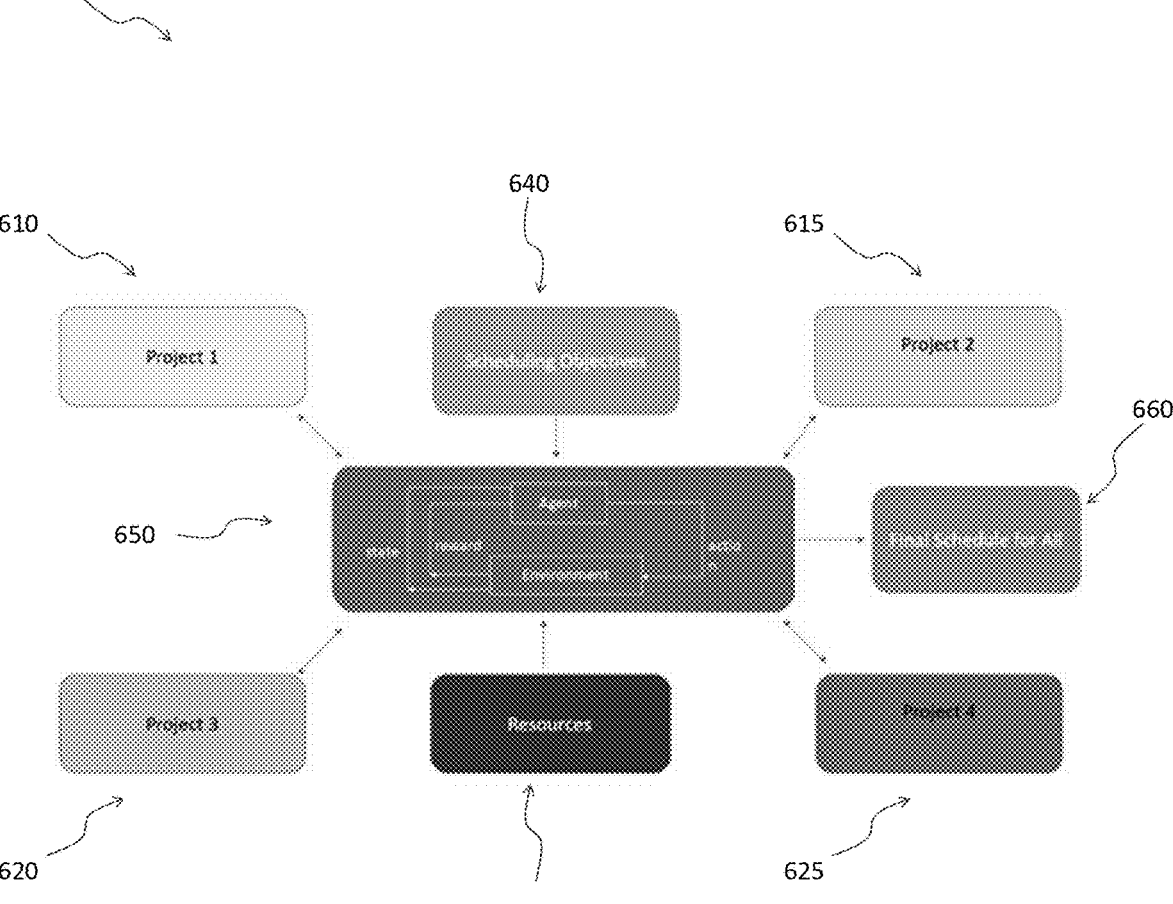
FIG. 6 schematically shows an embodiment of an overall design of an AI auto-scheduler for multiple projects.

In embodiments, AI auto-schedulers of the present disclosure may provide optimized detailed task schedules for scheduling more than one project. FIG. 6 schematically shows an embodiment of the overall design of an AI auto-scheduler 600 for scheduling four projects. This is a non-limiting example of scheduling more than one project, and is not to be taken as limiting the number of projects that can be scheduled using the systems, methods, or schedulers herein disclosed.

As shown in FIG. 6, a trained reinforcement engine 650 receives inputs from various sources, including project 1 610, project 2 615, project 3 620, and project 4 625. The projects may be similar to each other, or they may be dissimilar. The projects may include building factories, hospitals, warehouses, shipyards, and the like. The four projects have various requirements of resources, personnel, time demands, and the like.

The level 1 nodes are described by each of projects, 610, 615, 620, and 625 shown in FIG. 6. Each of these level 1 nodes have at least one level 2 nodes comprising their subsystems. Each level 2 node has at least one level 3 work package. The collection of work packages described by the overall WBS defines all of the items/tasks to be scheduled by the AI auto-scheduler 600. Each of the items/tasks defined in the work packages of each project is provided to a trained reinforcement engine 650 as a set of data in a database.

The resources and constraints 630 for each of the projects are provided as databases to the trained reinforcement engine 650 as a set of data in a database. The scheduling objectives 640 for each project, as well as the scheduling objectives of the entire 4-project job are provided as databases to the trained reinforcement engine 650.

The outputs from the AI auto-scheduler 650 include a final optimum work package schedule 660 that is based the inputs 610, 615, 620, 625, 630, and 640. The final optimum work package schedule 660 includes a detailed sequence of tasks to be carried out, task start dates and end dates, and a schedule chart. The trained reinforcement engine 650 generates a detailed final schedule that includes the work packages for all of the entire 4-project job.

Training a Reinforcement Engine

An AI auto-scheduler incorporating a reinforcement engine may be trained by deep reinforcement learning to schedule jobs more proficiently than a professional scheduler. The reinforcement engine in an AI auto-scheduler is trained by combining machine learning (ML) with reinforcement learning (RL) and deep learning. RL begins the learning process by incorporating a computational agent to make decisions by trial and error. This combination allows software systems the ability to learn and improve themselves from experience without being explicitly programmed. Instead, the problem to be solved is modeled, rather than programming the solution itself, and the deep reinforcement model is trained to perform a given task based on "training data" in order to learn how to generate specific types of outputs based on specific types of inputs. Thus, ML is useful for hard-to-solve problems that may have many viable solutions. ML solutions can exhibit non-expected behavior due to the AI and can improve over time based on additional training data accumulated over time.

The deep RL incorporates deep learning into the solution, allowing agents to make decisions from unstructured input without manual engineering of the state space. The technique allows deep RL algorithms to take in very large amounts of data, and then to decide what actions to perform to optimize an object. Thereby, an AI auto-scheduler can learn dynamically, and gain greater accuracy through continuous feedback. Initially, the agent knows nothing and learns by trial and error using different variables and is refined again and again. Since the AI auto-scheduler keeps experimenting, it can be coached to learn to make better decisions, and it compresses into hours what would take a human years to process.

In the case of AI auto-scheduling of large-scale capital projects, there is a massive combinatorial search space. Selecting an individual component (e.g., resources, constraints, etc.) in each step, assigning it to an IWP and then doing this for all components is a massive combinatorial task with almost endless complexity. There are clear tasks, constraints, and objectives to optimize against. This may be to minimize cost, minimize average slowdown, maximize resource efficiency, minimize downtime, etc., and whether constraints are violated. This could all be added (linear or weighted) into a sum which would then be optimized jointly. Furthermore, that way dynamic constraints could be embedded, where a violation of constraints is penalized differently over different actions. There may be past data available, and simulations of data is also possible. More specifically, past designs and/or simulated designs can be used to initially train a reinforcement approach. In a first training step, a neural network could be trained using past or simulated problems, i.e. training a network based on a supervised approach to have a better starting point than random initialization when proceeding to a reinforcement setup. One important choice is the choice of a proper reward function. RL works well where there are clear objectives as well as clear "game over" actions. In the case of auto-scheduling optimization, proper objectives may also include minimizing costs, labor, downtime etc. Furthermore, a "game over" status would be reached as soon as an action violates a physical constraint.

The training of an AI reinforcement learning engine for incorporation into an AI auto-scheduler proceeds through four steps: a training process; an inference process; an incremental improvement process; and deployment.

Figure 7:
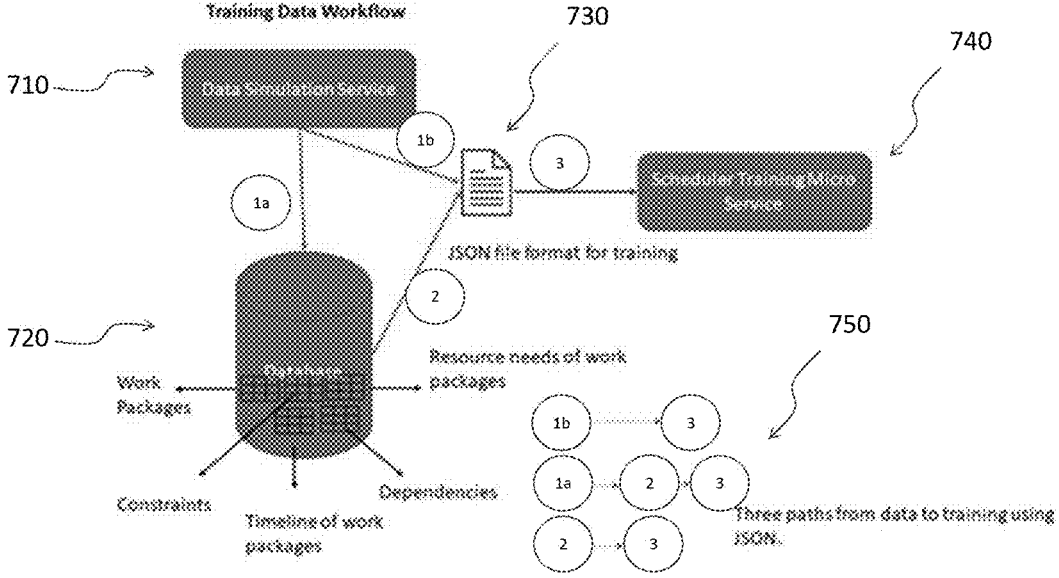
FIG. 7 schematically shows a training data workflow for training a reinforcement engine in AI auto-scheduling software.

FIG. 7 schematically shows a training data workflow 700 for the training process of preparing a data file for a Scheduler Training Micro Service 740. The training process is performed with a macro service written in Python to wrap the reinforcement learning for a given objective. The reinforcement engine is trained using large amounts of data that is generated by a data simulation service 710 for different projects and different combinations of work packages, resource needs, timelines, resources/constraints available etc. For example, the data may be generated for close to several hundreds of projects of different sizes, with each project consisting of varying work packages from several hundreds to thousands in numbers of different components, activities, resource requirements, available constraints of equipment's, cranes etc. with the intention of generating industry resemblance data with varying requirements. The data generated by the data simulation service 710 also includes the various domain factors of seasons, complexity and density of installations, height of installations and other such to cover various variable factors which can be seen in the industry while doing the actual planning and constructions.

The data from the data simulation service 710 may be provided to a database 720 along path 1a, or it may be formatted directly into a JSON file 730 for training along path 1b. The data provided to the database 720 along path 1a includes work package databases, constraints databases, timeline databases of the work packages, dependency databases, and resource needs databases of the work packages. These various databases from the database 720 are then formatted directly for a JSON file 730 for training along path 2.

Whether the data from the data simulation service 710 goes through the database 720 along path 1a, and then to the JSON file 730 along path 2, or the data from the data simulation service 710 goes directly into the JSON file 730 along path 1b, once the data is in the JSON file format it can be sent to the scheduler training micro service 740.

The database inputs are wrapped in JSON format. A simplified example of the JSON formatting is provided below:

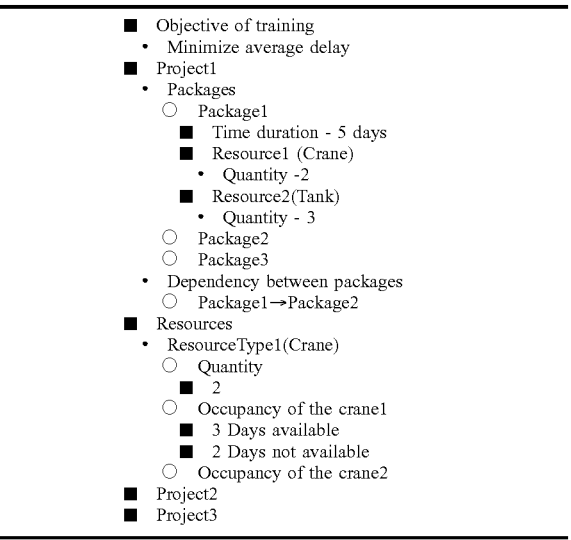

The formatted JSON file 730 is provided to the scheduler training micro service 740 along path 3. The three paths from the data to the training using JSON formatting 750 are shown on the training data workflow 700.

Figure 8A:
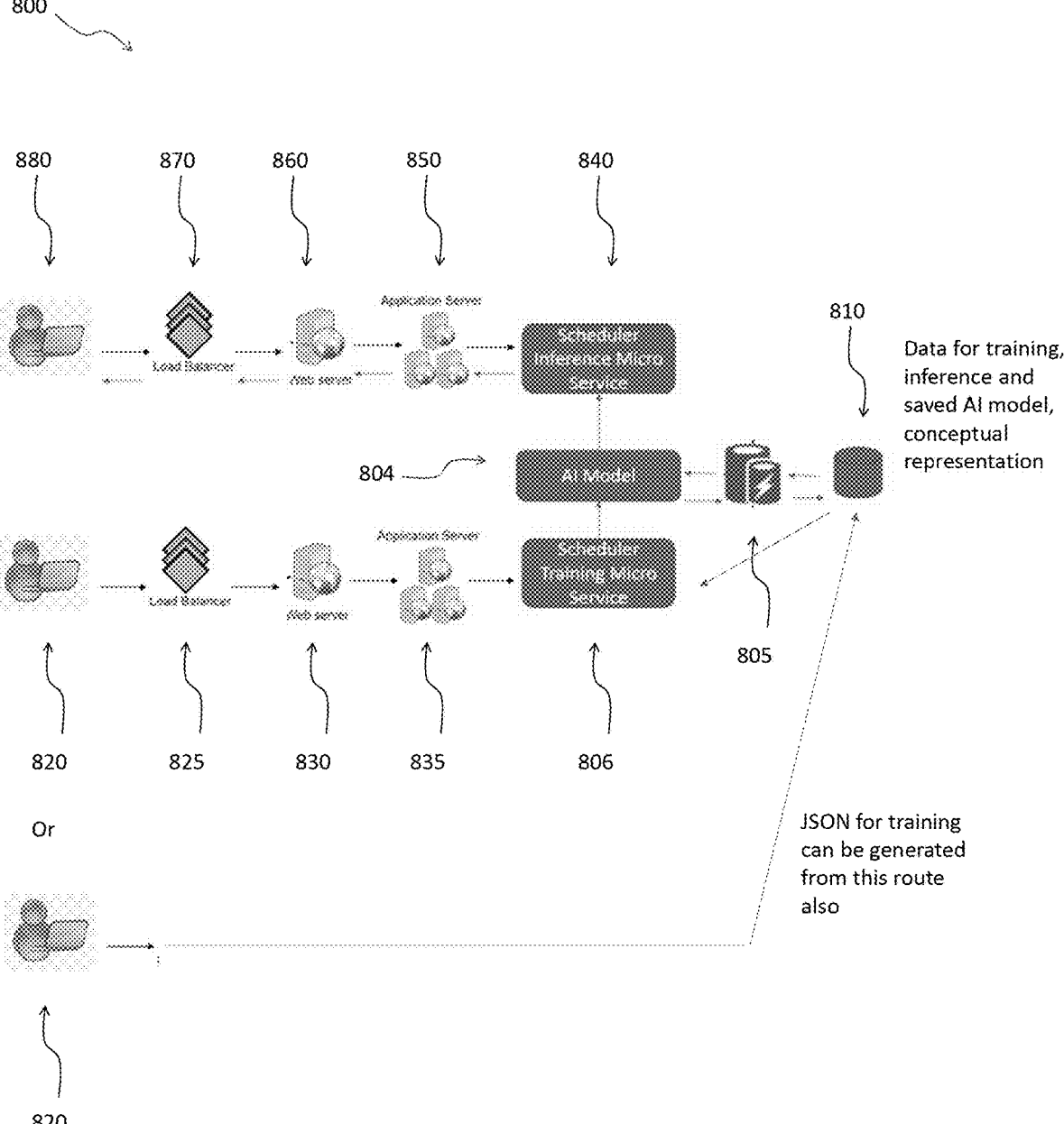
FIG. 8A shows a process for training and inferencing an AI model.

Once the JSON file has been formatted, it is provided to the AI model, as shown in FIG. 8A. The JSON formatted file is provided to the AI software for processing by a user 820. The JSON file proceeds to a load balancer 825, then to a web server 830, then to an application server 835, then into the scheduler training micro service 806 for training the AI model 804 along with additional training and historical data obtained from database 810 via cached database server 805.

Alternatively, the JSON file can be generated directly from the database 810 and cached using 805 for the purpose of training when user 820 invokes the training process, as also shown in FIG. 8A. In this case, the user 820 may load and/or initiate the JSON file to proceed directly from the database 810 to either the Scheduler Training Micro Service or through the Cached Data Base Server 805.

The AI model 804 sends the data to a scheduler inference micro service 840. The data proceeds from the scheduler inference micro service 840 to an application server 850, then proceeds to a web server 860, then proceeds to a load balancer 870, and finally to a user 880 who provides input to improve the outcomes of the training after reviewing the results of inference. The user 880 input could be binary, i.e. in the form "accept schedule" or "reject schedule." Furthermore, the user 880 could give feedback in terms of some metrics like: How human-like is the schedule? How much does the schedule deviate from what the local crews are used to (in terms of e.g. sequencing)? This could be codified in terms of a reward function for a Q-learning approach, training neural networks or a Q-table. Also, SARSA or Monte-Carlo-based algorithms are possible.

At step 880, feedback may be given by either a human or simulation software in terms of a reward function with regards to any subset of the above listed possibilities. The agent is fed with the information on IWP data, constraint data, resource limitations, time slots available, crew availability, parts etc. The constraints may be integrated in the simulation software or checked by humans and learned as part of their feedback and without explicit knowledge of these to the agent itself. By the given feedback, the agent is reinforced in its decisions so that it learns over time. The reinforcement learning engine can learn and be trained to improve its decisions over several large-scale capital projects and/or within a single construction project. The simulation software may know constraints like the availability of physical resources, the scheduling objectives, time slots, physical fundamentals or security regulations and determines whether these constraints are violated by the provided detailed schedule.

Figure 8B:
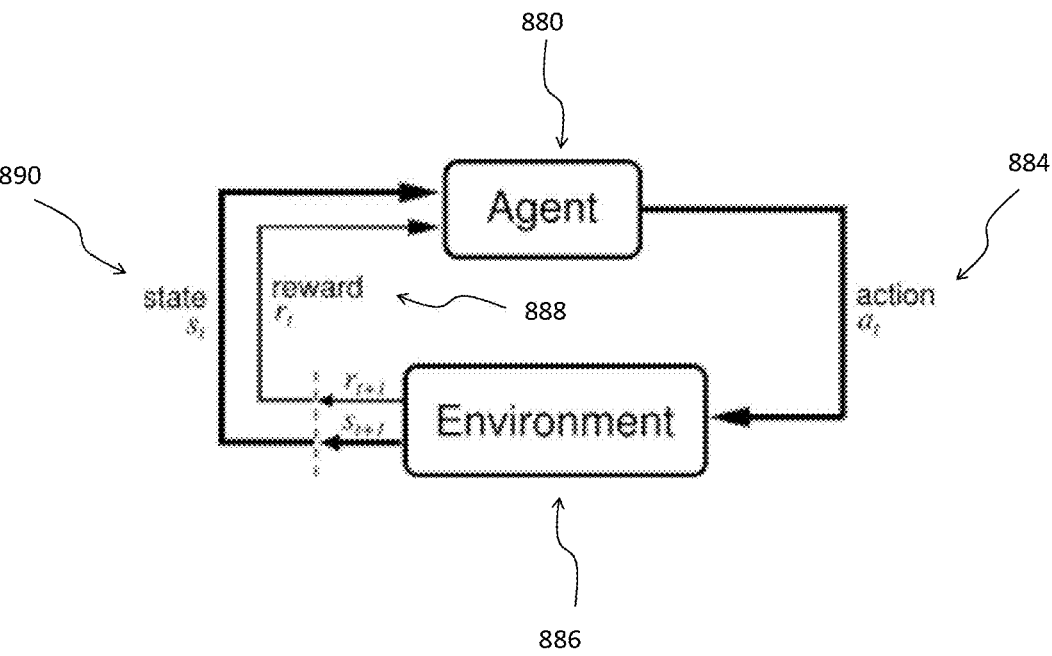
FIG. 8B shows a feedback loop recurring in reinforcement algorithms.

More than one reinforcement learning method may be incorporated into training the reinforcement engine. One method is the use of Q-learning with the use of Q-tables to learn the reward for explicit combinations of state and action. Another method is to a neural network architechture instead of a Q-table. FIG. 8B shows a feedback loop recurring in reinforcement algorithms. Referring to FIG. 8B, an agent 880 takes an action "$a_t$" 884 in an environment 886 and receives a reward "$r_t$" 888 in a state "$s_t$" 890. Both the Q-learning method and the neural network architechture are trained to predict the Q-function Q(s,a)—e.g., the reward 888 of taking action "$a_t$" 884 in state "$s_t$" 890. The Q-table represents the Q-function as a look-up table. That is, the Q-table is an exact mapping of states seen during training to actions, and thus, does not adapt to unseen states and cannot provide predictions on such. However, neural networks that operate as function approximators come into play. Neural networks have the advantages of providing the flexibility to adapt to unseen states, and they scale well to large state action spaces. In the same way as using a Q-table, the reward function for a neural network is used to update the Q-values. A Q-table is learned by using the reward function and the Bellmann equation. A neural network is also learned by using the reward function, but then uses backpropagation to update the network weights.

Instead of human feedback, a Q-learning-approach can also be used based on the IWP data, constraints, and resources, and feedback can be given to a reinforcement learning engine in terms of whether a constraint is violated or not. This approach would generate scheduling alternatives purely on its own, where a reward function 888 would codify which and how many constraints are violated. This would be set by the simulation environment 886 where the constraints are given as above, and the agent 880 could then explore the action space towards first a feasible and—in a second or more steps—even optimal scheduling solution. The agent 880 decides which parts to select in an IWP, which resources/constraints/objectives to assign to and schedules start and finish dates, thus, generating a sequence of many IWP iteratively. Once the data has been trained, the data proceeds back to the Scheduler Inference Micro Service 840 along the same path.

Figure 9:
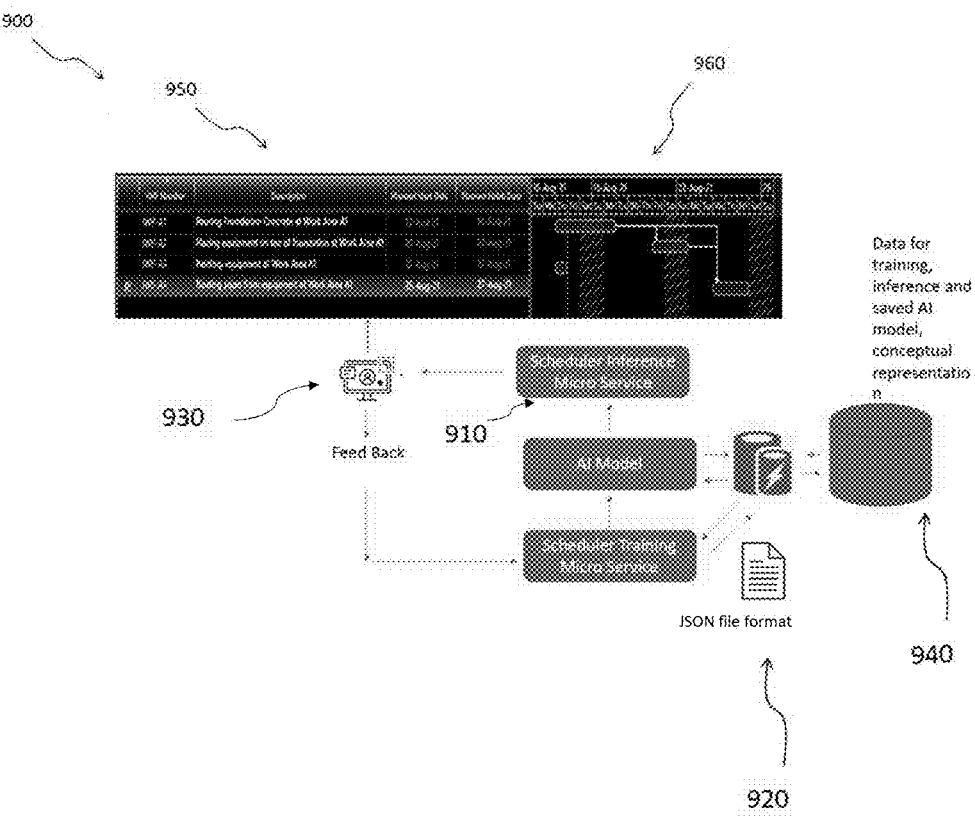
FIG. 9 shows a schematic layout of the incremental improvement process.

FIG. 9 shows a schematic layout of the incremental improvement process 900. The incremental improvement process 900 involves iterating a loop that includes the scheduler inference micro service 910, the JSON file 920, a user interface 930, and the database 940. As the scheduler inference micro service 910 operates on the JSON file, modified schedules are provided to a user at the user interface 930. The user may provide feedback to improve the outcomes of the training. As above, the user input could be binary, i.e. in the form "accept schedule" or "reject schedule."

An example of a schedule 950 together with Gantt chart 960 is shown in FIG. 9. A user interacting with the user interface 930 may provide input to the system such that the Schedular Inference Micro Service 910 provides improved schedules consistent with the inputs of the user. The output of this incremental improvement process 900 is the AI reinforcement engine model, saved in the database 940. Once the AI reinforcement engine model is saved in the database 940, it may be incorporated into the AI auto-scheduler.

Figure 10A:
FIG. 10A shows a detailed schedule chart generated either manually or by a different mechanism but without applying the AI auto scheduler.

FIG. 10A shows a default detailed schedule chart 1000 generated either manually by experts, or by other mechanisms, but not by an AI auto scheduler. The detailed schedule chart 1000 is organized according to IWP numbers 1010. For each IWP number 1010, the chart lists a planned start date 1020, a planned finish date 1030, planned man hours 1040, crew size 1050, and a Gantt chart 1055 showing a graphic representation of a line in a calendar to show the planned start dates 1020 and planned finish dates 1030 for each IWP number 1010 in comparison to the start and finish dates of other IWP numbers. In addition to the specific start dates 1020 and finish dates 1030, the detailed schedule chart 1000 shows the sequence of execution of the various tasks.

In detailed schedule chart 1000, each IWP number 1010 is entered, and shows a start date, a finish date, planned man hours, and crew size. However, the detailed schedule chart 1000 does not show the real schedule or the sequencing of any tasks, because the tasks have not been scheduled according to the AI auto scheduler.

Figure 10B:
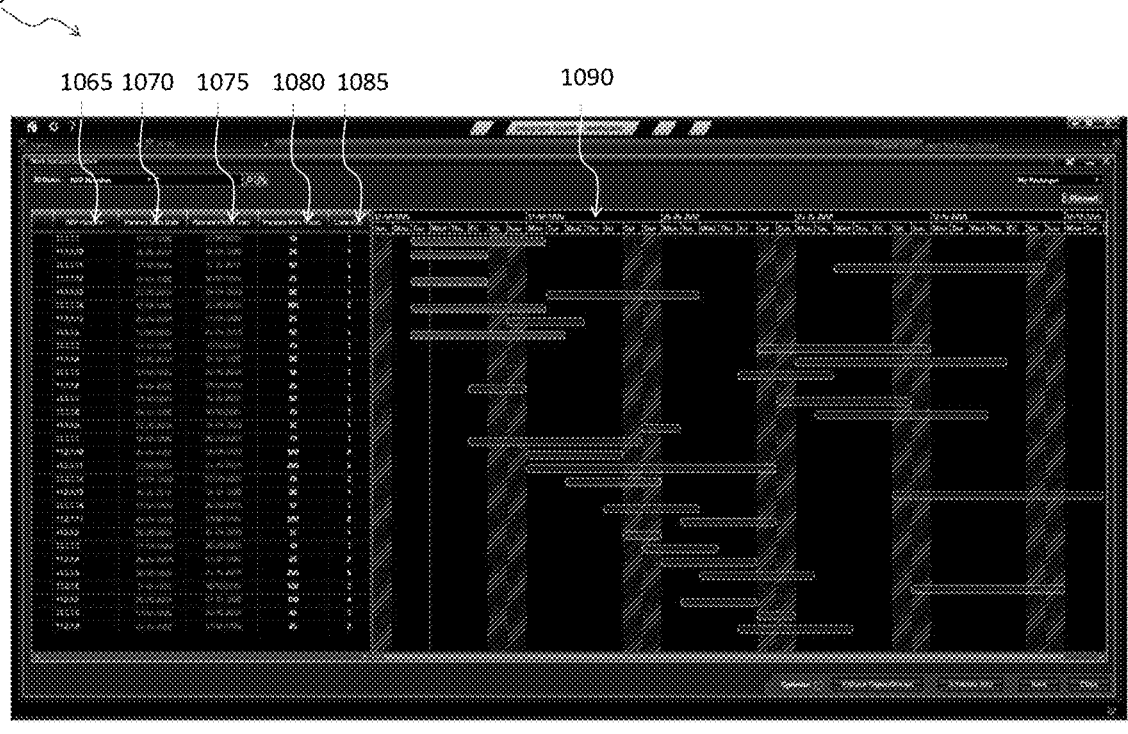
FIG. 10B shows a detailed schedule chart generated by an AI auto-scheduler.

FIG. 10B shows a detailed schedule chart 1060 generated by an AI auto-scheduler incorporating a reinforcement engine following completion of the training of reinforcement engine. The detailed schedule chart 1060 is organized according to IWP numbers 1065. For each IP number 1065, the chart lists planned start date 1070, planned finish date 1075, planned man hours 1080, crew size 1085, and Gantt chart 1090 showing a graphic representation of a line in a calendar to show the planned start dates 1070 and planned finish dates 1075 for each IWP number 1065 in comparison to the start and finish dates of other IWP numbers. In addition to the specific start dates 1070 and finish dates 1075, the detailed schedule chart 1060 shows the sequence of execution of the various tasks.

In contrast to detailed schedule chart 1000, detailed schedule chart 1060 shows the dependencies and the sequencing of each task according to each IWP number 1065. Detailed schedule chart 1060 shows how start dates 1070 and finish dates 1075 are staggered according to the dependencies and the sequencing of the tasks. The presence of the dependencies and the sequencing of the tasks indicates that the AI auto-scheduler has incorporated a trained reinforcement engine.

EXAMPLES

The following examples are intended to further illustrate the disclosure and its preferred embodiments.

Example 1

An artificial intelligence (AI) reinforcement engine was trained for use in an AI auto-scheduler. The reinforcement engine was trained by deep reinforcement learning (RL) to train the AI auto-scheduler how to become a professional scheduler. The reinforcement engine in the AI scheduler was trained by combining machine learning (ML) with RL and deep learning. The training of the AI reinforcement engine proceeds through four steps: training process; inference process; incremental improvement; and deployment.

1. Training Process Package

The inputs to the training process were set of projects with multiple variation of packages described above. The inputs were wrapped in Json format with following structure.

A sample JSON file formatted to be acted upon by the AI software is provided below in Table 1. The sample JSON file is for an IWP Package "IWP-A1" described as "pouring Foundation Concrete at Work Area A1."

TABLE 1

SAMPLE JSON FILE

```
// input
{
    "packages": [
        //Package - IWP-A1
        {
            //Package basic properties
            "id": "IWP-001",
            "name": "IWP-A1",
            "description": "Pouring Foundation Concrete
at Work Area A1",
            "level2PackageId": "CWP-A1",
            "discipline": "Structure",
            //Required Resources
            "requiredResources":[
                {
                    "resourceTypeId" : "CRANE-001",
                    "resourceQuantity": 4,
                    "ResourceType": "Crane"
                },
                {
                    "resourceTypeId" : "FORKLIFT-001",
                    "resourceQuantity": 3,
                    "ResourceType": "Forklift"
                }
            ],
            //Package Planned Duration
            "plannedDuration": {
                "Quantity" : 4,
                "Units": "Days"
            },
            //Resource internal dependencies for this
package to execute
            "resourceIds_Dependencies":["CRANE-001",
"FORKLIFT-001"], //Optional Input - CRANE-001 is required
first and later FORKLIFT-001
            //Package Dependencies
            "package_Dependecies": [ ] //For the first
package there will be no dependencies (successors or
predecessors)
        },
        //Package - IWP-A2
        {
            //Package basic properties
            "id": "IWP-002",
            "name": "IWP-A2",
            "description": "Placing equipment on top of
foundation at Work Area A1",
            "level2PackageId": "CWP-A1",
            "discipline": "Equipment",
            //Required Resources
            "requiredResources":[
                {
                    "resourceTypeId" : "CRANE-001",
                    "resourceQuantity": 4,
                    "ResourceType": "Crane"
                },
                {
                    "resourceTypeId" : "CRANE-002",
                    "resourceQuantity": 2,
                    "ResourceType": "CrawlerCrane"
                }
            ],
            //Package Planned Duration
            "plannedDuration": {
                "Quantity" : 2,
                "Units": "Days"
            },
```

TABLE 1-continued

SAMPLE JSON FILE

```
            //Resource internal dependencies for this
package to execute
            "resourceIds_Dependencies":["CRANE-001",
"CRANE-002"], //Optional Input - CRANE-001 is required
first and later CRANE-002
            //Package Dependecies
            "package_Dependecies": {
                "predecessors":["IWP-001"],
                "successors": ["IWP-004"]
            }
        },
        //Package - IWP-A3
        {
            //Package basic properties
            "id": "IWP-003",
            "name": "IWP-A3",
            "description": "Painting equipment at Work
Area A1",
            "level2PackageId": "CWP-A2",
            "discipline": "Painting",
            //Required Resources
            "requiredResources":[
                {
                    "resourceTypeId" : "StepLadder-001",
                    "resourceQuantity": 4,
                    "ResourceType": "Ladder"
                },
                {
                    "resourceTypeId" : "ExtensionLadder-
001",
                    "resourceQuantity": 2,
                    "ResourceType": "Ladder"
                }
            ],
            //Package Planned Duration
            "plannedDuration": {
                "Quantity" : 5,
                "Units": "Hours"
            },
            //Resource internal dependencies for this
package to execute
            "resourceIds_Dependencies":[ ], //Optional
Input - No dependecies b/w resources
            //Package Dependecies
            "package_Dependecies": [ ] //No dependecies
        },
        //Package - IWP-A4
        {
            //Package basic properties
            "id": "IWP-004",
            "name": "IWP-A4",
            "description": "Routing pipes from equipment
at Work Area A1",
            "level2PackageId": "CWP-A2",
            "discipline": "Piping",
            //Required Resources
            "requiredResources":[
                {
                    "resourceTypeId" : "CRANE-005",
                    "resourceQuantity": 4,
                    "ResourceType": "Crane"
                },
                {
                    "resourceTypeId" : "HYDRAULIC-
EXCAVATOR-002",
                    "resourceQuantity": 2,
                    "ResourceType": "Excavator"
                }
            ],
            //Package Planned Duration
            "plannedDuration": {
                "Quantity" : 2,
                "Units": "Days"
            },
            //Resource internal dependencies for this
package to execute
            "resourceIds_Dependencies":["HYDRAULIC-
EXCAVATOR-002", "CRANE-005"], //Optional Input - CRANE-
```

<div style="display:flex">
<div>

TABLE 1-continued

SAMPLE JSON FILE

```
001 is required first and later CRANE-002
        //Package Dependecies
        "package_Dependecies": {
            "predecessors":["IWP-001", "IWP-002"],
            "successors": [ ]
            }
        }
    ],
    "schedulingObjective":1, //1> minimize average
delay, 2> effective resource utilization, 3> meet
customer dates etc
    //Constraints or Availability of resources
    "constraints":[
        {
            "Id" : "CRANE-001",
            "description": "Rough Terrain Crane",
            "availableQuantity": 5,
            "resource_Type": "Crane",
            "available_Days": ["12/8/2021", "13/8/2021",
"14/8/2021", "17/8/2021"]
        },
        {
            "Id" : "CRANE-005",
            "description": "Small Terrain Crane",
            "availableQuantity": 5,
            "resource_Type": "Crane",
            "available_Days": ["11/8/2021", "13/8/2021",
"14/8/2021", "17/8/2021"]
        },
        {
            "Id" : "CRANE-002",
            "description": "Terrain Crane",
            "availableQuantity": 7,
            "resource_Type": "CrawlerCrane",
            "available_Days": ["15/8/2021", "18/8/2021",
"21/8/2021"]
        },
        {
            "Id" : "FORKLIFT-001",
            "description": "Fork lift of type A101",
            "availableQuantity": 5,
            "resource_Type": "Forklift",
            "available_Days": ["12/8/2021", "13/8/2021",
"14/8/2021"]
        },
        {
            "Id" : "StepLadder-001",
            "description": "Step ladder 6ft",
            "availableQuantity": 5,
            "resource_Type": "Ladder",
            "available_Days": ["12/8/2021", "13/8/2021",
"14/8/2021"]
        },
        {
            "Id" : "ExtensionLadder-001",
            "description": "Extension ladder 8ft",
            "availableQuantity": 5,
            "resource_Type": "Ladder",
            "available_Days": ["12/8/2021", "13/8/2021",
"14/8/2021"]
        },
        {
            "Id" : "HYDRAULIC-EXCAVATOR-002",
            "description": "Excavator of type Ex-101",
            "availableQuantity": 5,
            "resource_Type": "Excavator",
            "available_Days": ["12/8/2021", "13/8/2021",
"14/8/2021"]
            }
        ]
    }
// output
{
    "scheduledPackages": [
        {
            "package_Id":"IWP-001", //pouring foundation
            "startDate": "12/08/2021",
            "finishDate": "17/08/2021"
```

</div>
<div>

TABLE 1-continued

SAMPLE JSON FILE

```
        },
        {
            "package_Id":"IWP-003", //painting equipment
            "startDate": "12/08/2021",
            "finishDate": "12/08/2021"
        },
        {
            "package_Id":"IWP-002", //placing equipment
on the foundation
            "startDate": "18/08/2021",
            "finishDate": "25/08/2021"
        },
        {
            "package_Id":"IWP-004", //routing pipes from
the equipment
            "startDate": "26/08/2021",
            "finishDate": "31/08/2021"
            }
        ]
    }
```

The sample JSON file shown in Table 1 delineates at least the following resources and constraints for each IWP: Package basic properties; Required Resources; Package Planned Duration; and Resource internal dependencies.

The output of this service process is the AI reinforcement engine model, saved in the database. This is usually supposed to be performed once per project or once for all, depending upon the agreement on the dataset being used.

Figure 11A:
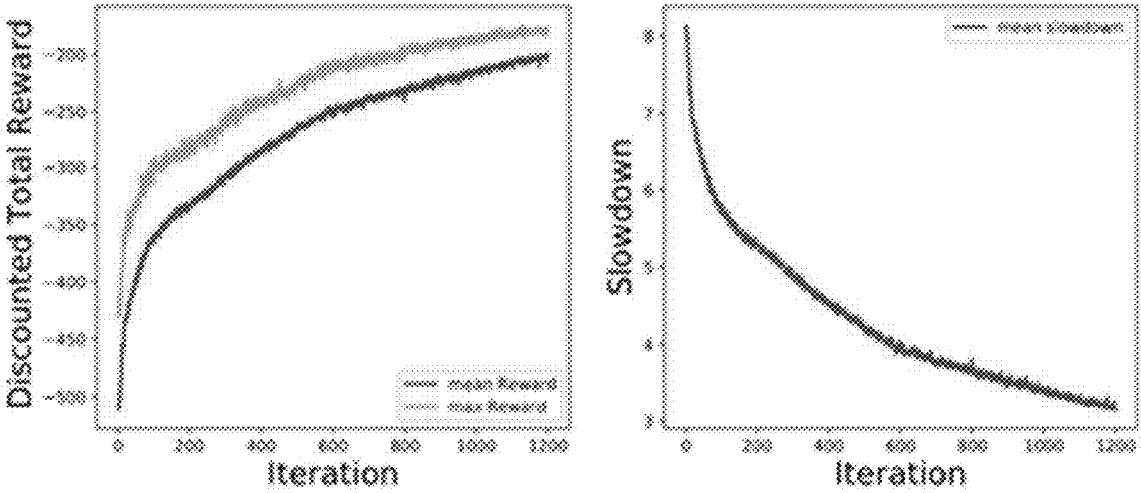
FIG. 11A shows the results of performing over one thousand iterations.
Figure 11B:
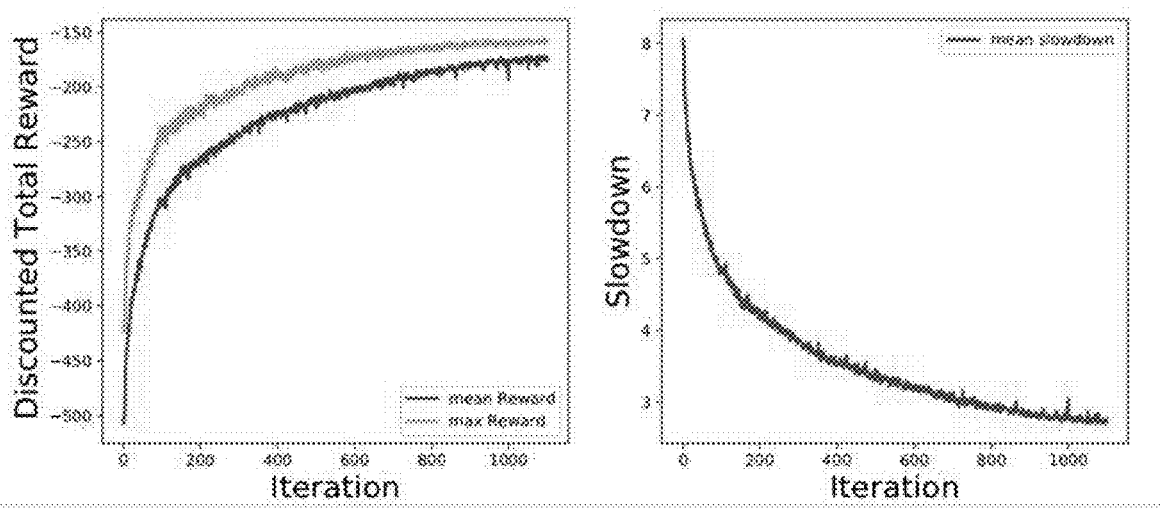
FIG. 11B shows the results of performing over one thousand iterations.

The training can include using different combinations of neural networks, and the algorithms were trained on trial-and-error basis with different learning rates. FIGS. 11A and 11B show the sample results of performing over one thousand iterations with two different learning rates. The learning rate was 0.1 for FIG. 11A, and was 0.01 for FIG. 11B.

Different neural network configurations were trained and tested. Neural networks having one or more input layers, one or more hidden layers with a plurality of neurons, and one or more output layers were tested. A neural network with one input layer, one hidden layer with several neurons and one output layer was trained for success.

A Gaussian distribution with standard deviation in the example of 0.01 was considered for Weight distribution.

2. Inference Process

The inference process was performed by code written in Python wrap to give the recommendation from the saved AI model in the database. The inputs to these services are set of packages/resources similar to the above and output is the JSON format, reflecting the schedule as shown below along with some set metadata.

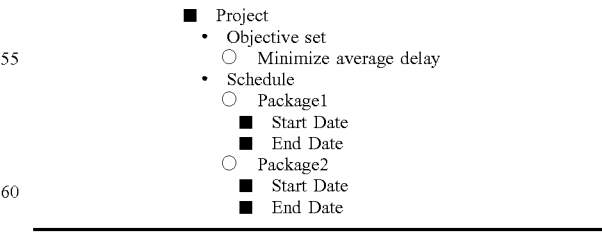

A schematic layout of the test design 800 is shown in FIG. 8. The test services included a Scheduler Inference Micro Service 840, and Scheduler Training Micro Service 806 which were refined by the AI model 804, and integrated into the server database 810. Feedback was incorporated into the </div>
</div> reward functions used by the system to train or re-train the reinforcement learning models, which then can be applied to ongoing or new scheduling tasks. Thus, the incorporation of expert feedback and training the model expedited the training process and improve the outcomes.

3. Incremental Improvement

The process of incremental improvement comprises using the feedback of a domain expert/user from the inference process to improve the performance of system by automated or semi-automated re-training of AI-based modules and/or by manual adjustments.

For the purposes of training the AI auto-scheduler with incremental improvement, the reinforcement learning AI auto-scheduler of an exemplary embodiment was deployed into local, proprietary scheduling software (Smart Plant Construction or Smart Build), as a set of two micro services on the cloud in a massive auto scalable system.

The test software was modified to include a new command in the system that collects the packages and associated resources from its own SQL server database, wraps them into the JSON format as needed by the training/inference service above, and makes a call over the internet.

The response is received back by the client again in the JSON form, from the inference service, to store and visualize the schedule in the system for experts to review or accept it finally.

4. Deployment

In an exemplary embodiment, the trained reinforcement engine was integrated into an AI auto-scheduler. The AI auto-scheduler with the trained reinforcement engine was tested by using databases from a given job.

For the test, the JSON file included the sample JSON file shown in Table 1. The JSON file in Table 1 includes IWP Numbers IWP-A1, IWP-A2, IWP-A3, and IWP-A4 corresponding to the Descriptions "Pouring Foundation Concrete at Work Area A1," "Placing equipment on top of foundation at Work Area A1," "Painting equipment at Work Area A1," and "Routing pipes from equipment at Work Area A1," respectively.

Figure 12:
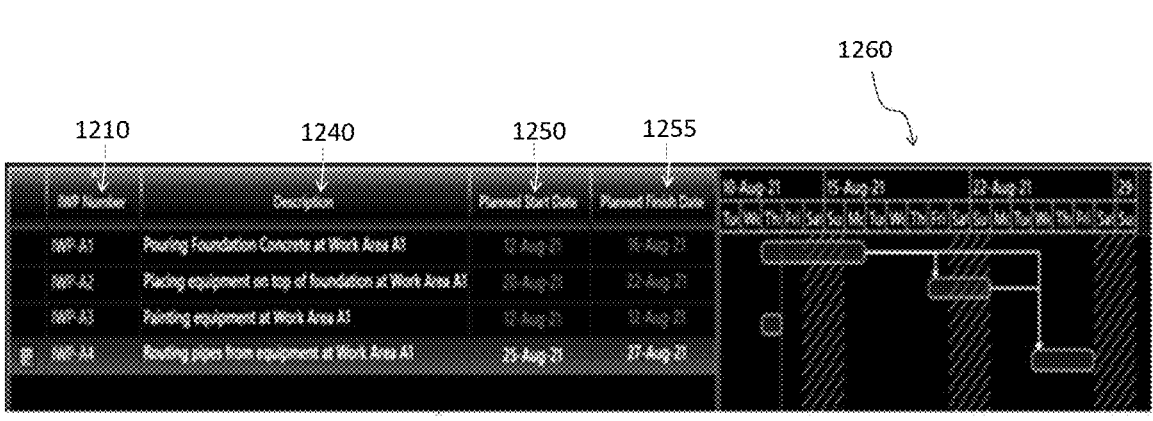
FIG. 12 shows a portion of a detailed schedule.

FIG. 12 shows a portion of a detailed schedule 1200 that was generated by the test run using the JSON file included the sample JSON file shown in Table 1, and described above. The detailed schedule 1200 includes IWP Numbers 1210, Descriptions 1240, planned start dates 1250, planned finish dates 1255, and a Gantt chart 1260.

The detailed schedule produced by the test run successfully scheduled the job according to the prime objectives in the databases, and the results were reproducible.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A system for generating a task schedule for a target work project using an electronic device, the system comprising:

at least one processor coupled to at least one memory storing computer program instructions which, when run on the at least one processor, causes the system to perform computer processes comprising:

providing a reinforcement learning engine trained for a plurality of different scheduling objectives based on a plurality of data sets representing a plurality of different work projects including at least one of simulated work projects or actual completed work projects, each scheduling objective having a different reinforcement learning reward function;

receiving a user-selected scheduling objective from among the plurality of different scheduling objectives; and generating a task schedule for the target work project by the trained reinforcement learning engine based on the selected scheduling objective and its corresponding reward function, wherein the trained reinforcement learning engine is capable of generating different task schedules for the target work project based on the plurality of scheduling objectives.

2. The system as defined by claim 1, wherein the target work project is associated with:

a total work database configured to contain items representing work packages;

a resources database configured to contain items representing resources required to fulfill the work packages;

a constraints database configured to contain items representing constraints to fulfilling the work packages; and a scheduling objective database configured to designate a prime objective that is to be achieved by the optimum task schedule.

3. The system as defined by claim 2, wherein:

the total work database comprises at least a first list of a plurality of work packages to be performed;

the resources database comprises:

a second list of resource requirements for each work package of the plurality of work package to be performed; and a third list of time requirements for each resource requirement of the plurality of work packages to be performed; and the constraints database comprises:

a fourth list of resource types for each resource requirement of the plurality of work packages to be performed;

a fifth list of a quantity of each resource type for each resource requirement of the plurality of work packages to be performed; and a sixth list of the time availability for each resource type for each resource requirement of the plurality of work packages to be performed.

4. The system as defined by claim 1, wherein the plurality of different scheduling objectives comprises minimize average slow down; minimize average completion time; maximize efficiency of resource utilization; prioritize meeting desired customer dates; and prioritize meeting customer cost estimates.

5. The system as defined by claim 1, wherein the reinforcement learning engine comprises at least one neural network.

6. The system as defined by claim 5, wherein the at least one neural network comprises one input layer, one or more hidden layers with a plurality of neurons, and one output layer.

7. The system as defined by claim 1, wherein the optimum task schedule comprises a sequence of work packages to be performed, a start date and an end date for each work package of the plurality of work packages to be performed, and a schedule chart for each work package of the plurality of work packages to be performed.

8. The system as defined by claim 1, wherein the trained reinforcement learning engine is further configured to provide: an artificial intelligence total job duration service; an artificial intelligence resource requirement service; an artificial intelligence work package dependency service; and an artificial intelligence resource dependency service.

9. The system as defined by claim 8, wherein the services are provided as cloud-based micro-services.

10. The system as defined by claim 1, wherein the reinforcement learning engine receives user feedback regarding the task schedule for the target work project generated by the trained reinforcement learning engine and updates at least one reward function based on the user feedback.

11. A method for generating a task schedule for a target work project using an electronic device, the method comprising:

providing a reinforcement learning engine trained for a plurality of different scheduling objectives based on a plurality of data sets representing a plurality of different work projects including at least one of simulated work projects or actual completed work projects, each scheduling objective having a different reinforcement learning reward function;

receiving a user-selected scheduling objective from among the plurality of different scheduling objectives; and generating a task schedule for the target work project by the trained reinforcement learning engine based on the selected scheduling objective and its corresponding reward function, wherein the trained reinforcement learning engine is capable of generating different task schedules for the target work project based on the plurality of scheduling objectives.

12. The method as defined by claim 11, wherein the target work project is associated with:

a total work database configured to contain items representing work packages;

a resources database configured to contain items representing resources required to fulfill the work packages;

a constraints database configured to contain items representing constraints to fulfilling the work packages; and a scheduling objective database configured to designate a prime objective that is to be achieved by the optimum task schedule.

13. The method as defined by claim 12, wherein:

the total work database comprises at least a first list of a plurality of work packages to be performed;

the resources database comprises:

a second list of resource requirements for each work package of the plurality of work package to be performed; and a third list of time requirements for each resource requirement of the plurality of work packages to be performed; and the constraints database comprises:

a fourth list of resource types for each resource requirement of the plurality of work packages to be performed;

a fifth list of a quantity of each resource type for each resource requirement of the plurality of work packages to be performed; and a sixth list of the time availability for each resource type for each resource requirement of the plurality of work packages to be performed.

14. The method as defined by claim 11, wherein the plurality of different scheduling objectives comprises minimize average slow down; minimize average completion time; maximize efficiency of resource utilization; prioritize meeting desired customer dates; and prioritize meeting customer cost estimates.

15. The method as defined by claim 11, wherein the reinforcement learning engine comprises at least one neural network.

16. The method as defined by claim 15, wherein the at least one neural network comprises one input layer, one or more hidden layers with a plurality of neurons, and one output layer.

17. The method as defined by claim 11, wherein the optimum task schedule comprises a sequence of work packages to be performed, a start date and an end date for each work package of the plurality of work packages to be performed, and a schedule chart for each work package of the plurality of work packages to be performed.

18. The method as defined by claim 11, wherein the reinforcement learning engine is further configured to provide: an artificial intelligence total job duration service; an artificial intelligence resource requirement service; an artificial intelligence work package dependency service; and an artificial intelligence resource dependency service.

19. The method as defined by claim 18, wherein the services are provided as cloud-based micro-services.

20. The method as defined by claim 11, wherein the reinforcement learning engine receives user feedback regarding the task schedule for the target work project generated by the trained reinforcement learning engine and updates at least one reward function based on the user feedback.

\* \* \* \* \*